(12) United States Patent
Hanzawa et al.

(10) Patent No.: US 10,880,503 B2
(45) Date of Patent: Dec. 29, 2020

(54) SOLID-STATE IMAGE PICKUP DEVICE AND IMAGE PICKUP METHOD, AND ELECTRONIC APPARATUS

(71) Applicant: Sony Semiconductor Solutions Corporation, Kanagawa (JP)

(72) Inventors: Katsuhiko Hanzawa, Kanagawa (JP); Yoshikazu Nitta, Tokyo (JP); Hayato Wakabayashi, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 21 days.

(21) Appl. No.: 16/319,034

(22) PCT Filed: Sep. 19, 2017

(86) PCT No.: PCT/JP2017/033650
§ 371 (c)(1),
(2) Date: Jan. 18, 2019

(87) PCT Pub. No.: WO2018/066348
PCT Pub. Date: Dec. 4, 2018

(65) Prior Publication Data
US 2019/0182443 A1    Jun. 13, 2019

(30) Foreign Application Priority Data

Oct. 3, 2016 (JP) .................... 2016-195526

(51) Int. Cl.
*H04N 5/353* (2011.01)
*H04N 5/374* (2011.01)
(Continued)

(52) U.S. Cl.
CPC .......... *H04N 5/3535* (2013.01); *H04N 5/353* (2013.01); *H04N 5/374* (2013.01); *H04N 5/3745* (2013.01)

(58) Field of Classification Search
CPC .... H04N 5/3535; H04N 5/353; H04N 5/3745; H04N 5/379; H04N 5/37452
See application file for complete search history.

(56) References Cited

U.S. PATENT DOCUMENTS

2008/0210993 A1   9/2008  Oshikubo et al.
2011/0122301 A1*  5/2011  Yamura ................ H04N 5/2256
                                                        348/262
(Continued)

FOREIGN PATENT DOCUMENTS

EP      2337075 A2      6/2011
JP      2008-205638 A   9/2008
(Continued)

OTHER PUBLICATIONS

International Search Report and English translation thereof dated Dec. 12, 2017 in connection with International Application No. PCT/JP2017/033650.

*Primary Examiner* — Ahmed A Berhan
(74) *Attorney, Agent, or Firm* — Wolf, Greenfield & Sacks, P.C.

(57) ABSTRACT

The present disclosure relates to a solid-state image pickup device that is adapted to enable the light exposure time to be shortened, and an image pickup method, and an electronic apparatus. One pixel and the other pixel differ in the timing in which light exposure is started and in the timing in which the light exposure is ended. During the light exposure time of the one pixel, active light starts light emission, and completes the light emission. For example, before or after the light emission of the active light, the one pixel starts light exposure, and ends the light exposure. The other pixel starts light exposure in the timing in which the time Ta1 has passed after the active light starts light emission (the time Ta2 until the end of irradiation remains), and ends the light exposure after the light exposure of the one pixel ends. The present (Continued)

disclosure can be applied to, for example, an image pickup device that performs image pickup by using active light.

15 Claims, 30 Drawing Sheets

(51) Int. Cl.
  *H04N 5/3745* (2011.01)
  *H04N 5/369* (2011.01)

(56) References Cited

U.S. PATENT DOCUMENTS

| | | |
|---|---|---|
| 2011/0149104 A1 | 6/2011 | Mabuchi |
| 2013/0051700 A1* | 2/2013 | Jo ..................... H04N 5/23254 |
| | | 382/284 |
| 2017/0163914 A1 | 6/2017 | Hara |
| 2017/0230563 A1* | 8/2017 | Satou .................. H04N 5/2356 |

FOREIGN PATENT DOCUMENTS

| | | |
|---|---|---|
| JP | 2011-114558 A | 6/2011 |
| JP | 2011-130364 A | 6/2011 |
| JP | 2016-076807 A | 5/2016 |
| WO | WO 2016/027397 A1 | 2/2016 |

\* cited by examiner

FIG. 18
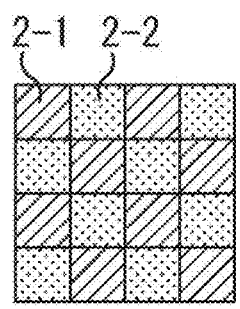
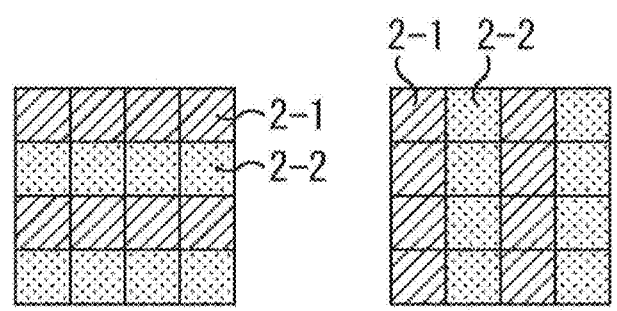
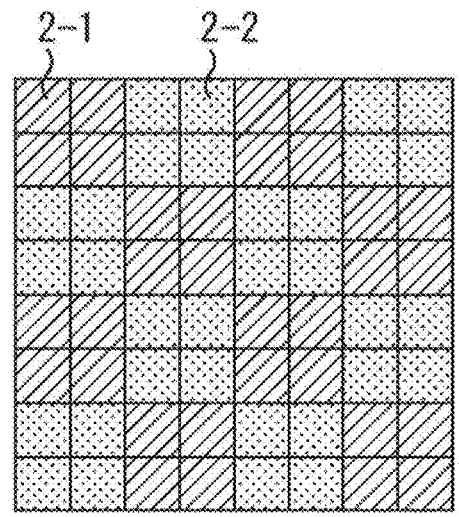

SOLID-STATE IMAGE PICKUP DEVICE AND IMAGE PICKUP METHOD, AND ELECTRONIC APPARATUS

CROSS-REFERENCE TO RELATED APPLICATIONS

This application claims the benefit under 35 U.S.C. § 371 as a U.S. National Stage Entry of International Application No. PCT/JP2017/033650, filed in the Japanese Patent Office as a Receiving Office on Sep. 19, 2017, which claims priority to Japanese Patent Application Number JP2016-195526, filed in the Japanese Patent Office on Oct. 3, 2016, each of which is hereby incorporated by reference in its entirety.

TECHNICAL FIELD

The present disclosure relates to a solid-state image pickup device and an image pickup method, and an electronic apparatus, and in particular, to a solid-state image pickup device that is adapted to enable the light exposure time to be shortened, and an image pickup method, and an electronic apparatus.

BACKGROUND ART

Patent document 1 proposes a technology in which even in a case where an image is taken while being irradiated with infrared light, visible light and infrared light can be properly separated from an image signal that includes the visible light and the infrared light.

In this proposal, by irradiating with infrared light over two frames, a difference in light exposure time is used to determine the visible light and the infrared light by computation processing.

CITATION LIST

Patent Document

Patent Document 1: Japanese Patent Application Laid-Open No. 2016-76807

SUMMARY OF THE INVENTION

Problems to be Solved by the Invention

However, in the case of the proposal of the patent document 1, the irradiation is performed over two frames, and therefore long LED light emission time is required.

The present disclosure has been devised in light of such circumstances, and is capable of shortening the light exposure time.

Solutions to Problems

A solid-state image pickup device according to one aspect of the present technology includes: a pixel array unit on which pixels are two-dimensionally arranged; and a light exposure control unit that controls light exposure time of a first pixel, and light exposure time of a second pixel that differs in light exposure time from the first pixel in such a manner that at least one of light exposure start time or light exposure end time differs according to light emission time of predetermined light in the pixel array unit.

The light exposure control unit is capable of controlling the light exposure time of the first pixel and the light exposure time of the second pixel in such a manner that the light exposure start time differs according to the light emission time of the predetermined light.

The light exposure control unit is capable of controlling the light exposure time of the first pixel and the light exposure time of the second pixel in such a manner that the light exposure start time differs by changing an inclusion ratio of the light emission time of the predetermined light.

The pixel is capable of including a PD.

The light exposure control unit is capable of controlling the light exposure start time by reset operation, and is capable of controlling the light exposure end time by charge transfer.

The pixel is capable of including an organic or inorganic organic photoelectric conversion film.

The light exposure control unit is capable of controlling the light exposure start time by reset operation, and is capable of controlling the light exposure end time by an upper electrode of the photoelectric conversion film.

The light exposure control unit is capable of controlling the light exposure start time of at least one of the first pixel or the second pixel by an upper electrode of the photoelectric conversion film, and is capable of controlling the light exposure end time by the upper electrode of the photoelectric conversion film.

The light exposure control unit is capable of controlling the light exposure time of the first pixel and the light exposure time of the second pixel in such a manner that at least one of the light exposure start time or the light exposure end time differs according to light emission times of a plurality of the predetermined lights.

The light exposure control unit is capable of controlling the light exposure time of the first pixel and the light exposure time of the second pixel in such a manner that at least one of the light exposure start time or the light exposure end time differs by changing inclusion ratios of the light emission times of a plurality of the predetermined lights respectively.

The solid-state image pickup device is capable of further including a computation unit that subjects images from the first pixel and the second pixel to mosaic processing, and performs computation processing on a pixel basis.

The light exposure control unit is capable of controlling the light exposure time of the first pixel, the light exposure time of the second pixel, and the light exposure time of a third pixel that differs in light exposure time from the first pixel and the second pixel in such a manner that at least one of the light exposure start time or the light exposure end time differs according to light emission times of a plurality of the predetermined lights.

The light exposure control unit is capable of controlling the light exposure time of the first pixel, the light exposure time of the second pixel, and the light exposure time of the third pixel in such a manner that at least one of the light exposure start time or the light exposure end time differs by changing inclusion ratios of the light emission times of a plurality of the predetermined lights respectively.

The solid-state image pickup device is capable of further including a computation unit that subjects images from the first pixel, the second pixel, and the third pixel to mosaic processing, and performs computation processing on a pixel basis.

The pixel array unit is capable of including a pixel having a conversion efficiency adjustable function.

An image pickup method according to one aspect of the present technology includes the step of controlling, by a solid-state image pickup device, light exposure time of a first pixel, and light exposure time of a second pixel that differs in light exposure time from the first pixel in such a manner that at least one of light exposure start time or light exposure end time differs according to light emission time of predetermined light in a pixel array unit on which pixels are two-dimensionally arranged.

An electronic apparatus according to one aspect of the present technology includes: a light-emitting unit that emits light; and a solid-state image pickup element, the solid-state image pickup element including: a pixel array unit on which pixels are two-dimensionally arranged; and a light exposure control unit that controls light exposure time of a first pixel, and light exposure time of a second pixel that differs in light exposure time from the first pixel in such a manner that at least one of light exposure start time or light exposure end time differs according to light emission time of light emitted by the light-emitting unit in the pixel array unit.

According to one aspect of the present technology, in the pixel array unit on which pixels are two-dimensionally arranged, the light exposure time of the first pixel, and the light exposure time of the second pixel that differs in light exposure time from the first pixel are controlled in such a manner that at least one of the light exposure start time or the light exposure end time differs according to the light emission time of predetermined light.

Effects of the Invention

According to the present technology, the light exposure time can be controlled. In particular, according to the present technology, the light exposure time can be shortened.

It should be noted that the effects described in the present description are to be construed as merely illustrative, and that effects of the present technology are not limited to those described in the present description, and thus an additional effect may be produced.

BRIEF DESCRIPTION OF DRAWINGS

FIG. 18 is a diagram illustrating an example of a pixel pattern.

MODE FOR CARRYING OUT THE INVENTION

Figure 1:
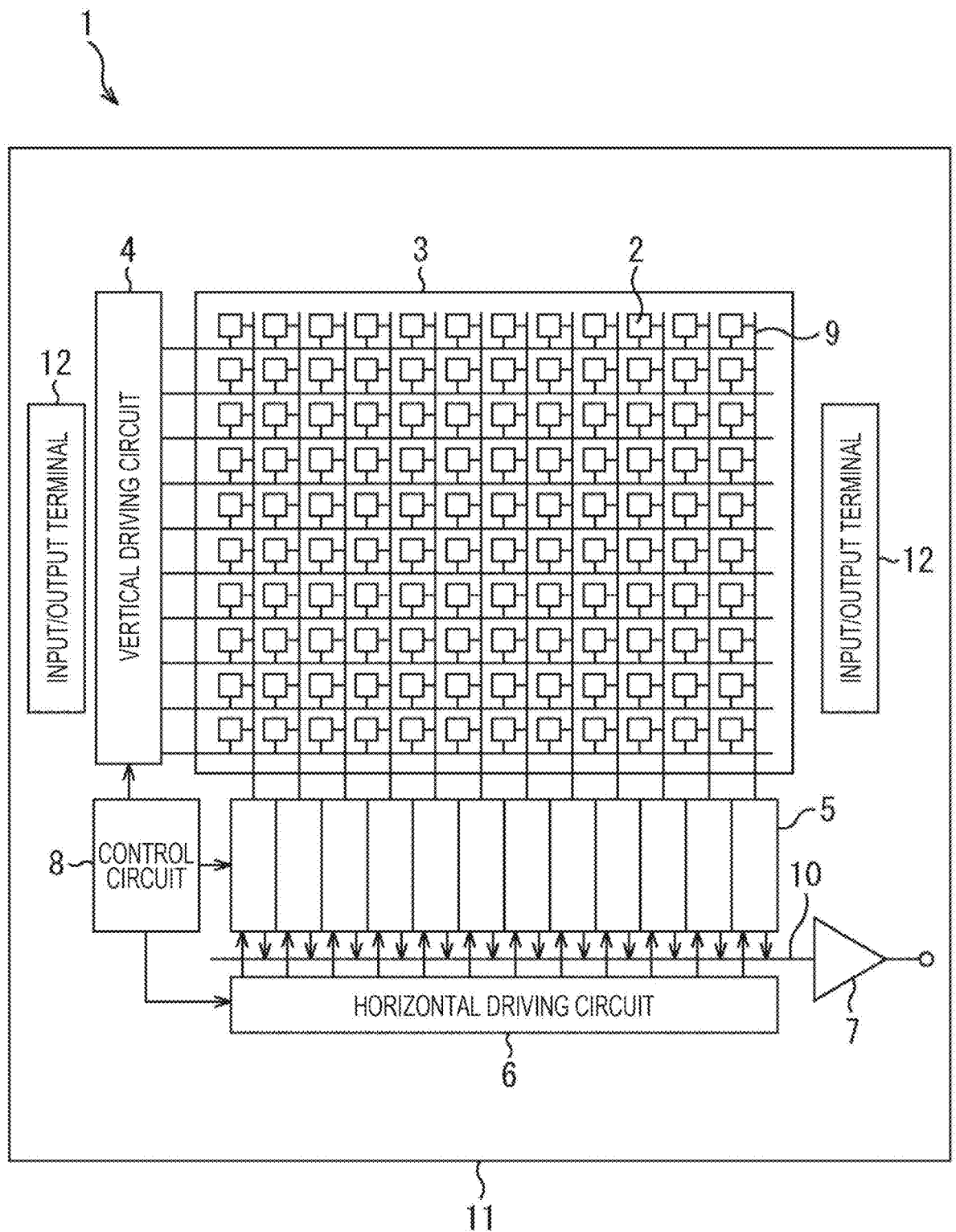
FIG. 1 is a block diagram illustrating a schematic configuration example of a solid-state image pickup device to which the present technology is applied.

Modes for carrying out the present disclosure (hereinafter referred to as embodiments) will be described below. It should be noted that explanations are made in the following order.

0. Explanation of device
1. First embodiment
2. Second embodiment
3. Third embodiment
4. Example of using image sensor
5. Example of electronic apparatus
6. Example of application to endoscopic operation system
7. Example of application to moving object 0. Explanation of Device Schematic Configuration Example of Solid-State Image Pickup Device FIG. 1 illustrates, as an example, a schematic configuration example of a Complementary Metal Oxide Semiconductor (CMOS) solid-state image pickup device that is applied to each embodiment of the present technology.

As shown in FIG. 1, a solid-state image pickup device (element chip) 1 includes a semiconductor substrate 11 (for example, a silicon substrate) having a pixel region (so-called an image-pickup region) 3 in which pixels 2 each including a plurality of photoelectric conversion elements are regularly and two-dimensionally arranged, and a peripheral circuit region.

The pixel 2 includes a photoelectric conversion element (for example, Photo Diode (PD)), and a plurality of pixel transistors (so-called MOS transistors). Three transistors, which are, for example, a transfer transistor, a reset transistor, and an amplification transistor, constitute the plurality of pixel transistors. The plurality of pixel transistors can also be constituted of four transistors by further adding a selection transistor.

In addition, the pixel 2 can also have a pixel sharing structure. The pixel sharing structure includes a plurality of photodiodes, a plurality of transfer transistors, one shared floating diffusion, and other pixel transistors shared one by one. The photodiodes are photoelectric conversion elements.

The peripheral circuit region includes a vertical driving circuit 4, column signal processing circuits 5, a horizontal driving circuit 6, an output circuit 7, and a control circuit 8.

The control circuit 8 receives an input clock, and data that gives an instruction on an operation mode or the like, and outputs data such as internal information of the solid-state image pickup device 1. More specifically, on the basis of a vertical synchronizing signal, a horizontal synchronizing signal, and a master clock, the control circuit 8 generates a clock signal that functions as a reference of the operations of the vertical driving circuit 4, the column signal processing circuits 5, and the horizontal driving circuit 6, and generates a control signal. Subsequently, the control circuit 8 inputs these signals into the vertical driving circuit 4, the column signal processing circuits 5, and the horizontal driving circuit 6.

The vertical driving circuit 4 includes, for example, a shift register, selects a pixel driving wiring line, supplies the selected pixel driving wiring line with a pulse for driving the pixel 2, and drives the pixel 2 on a line basis. More specifically, the vertical driving circuit 4 sequentially selects and scans each of the pixels 2 in the pixel region 3 on a line basis in the vertical direction, and supplies, through a vertical signal line 9, each of the column signal processing circuits 5 with a pixel signal based on a signal charge generated according to the amount of received light in the photoelectric conversion element of each of the pixels 2.

The column signal processing circuits 5 are arranged corresponding to, for example, respective columns of the pixels 2, and each subject signals output from the pixels 2 in one column to signal processing such as noise removal on a pixel column basis. More specifically, the column signal processing circuits 5 each perform signal processing such as Correlated Double Sampling (CDS) for removing fixed pattern noises specific to the pixels 2, signal amplification, and Analog/Digital (A/D) conversion. A horizontal selection switch (not illustrated) is connected and provided between an output stage of each of the column signal processing circuits 5 and a horizontal signal line 10.

The horizontal driving circuit 6 includes, for example, a shift register, and sequentially outputs a horizontal scanning pulse to select each of the column signal processing circuits 5 in order, which causes the each of the column signal processing circuits 5 to output a pixel signal to the horizontal signal line 10.

The output circuit 7 subjects a signal sequentially supplied from each of the column signal processing circuits 5 through the horizontal signal line 10 to signal processing, and then outputs the signal. There is also a case where the output circuit 7 performs, for example, buffering only; and there is also a case where the output circuit 7 performs black level adjustment, column dispersion correction, various digital signal processing, or the like.

The input/output terminal 12 is provided so as to exchange signals with the outside.

1. First Embodiment

Light Exposure Control of Pixels

Figure 2:
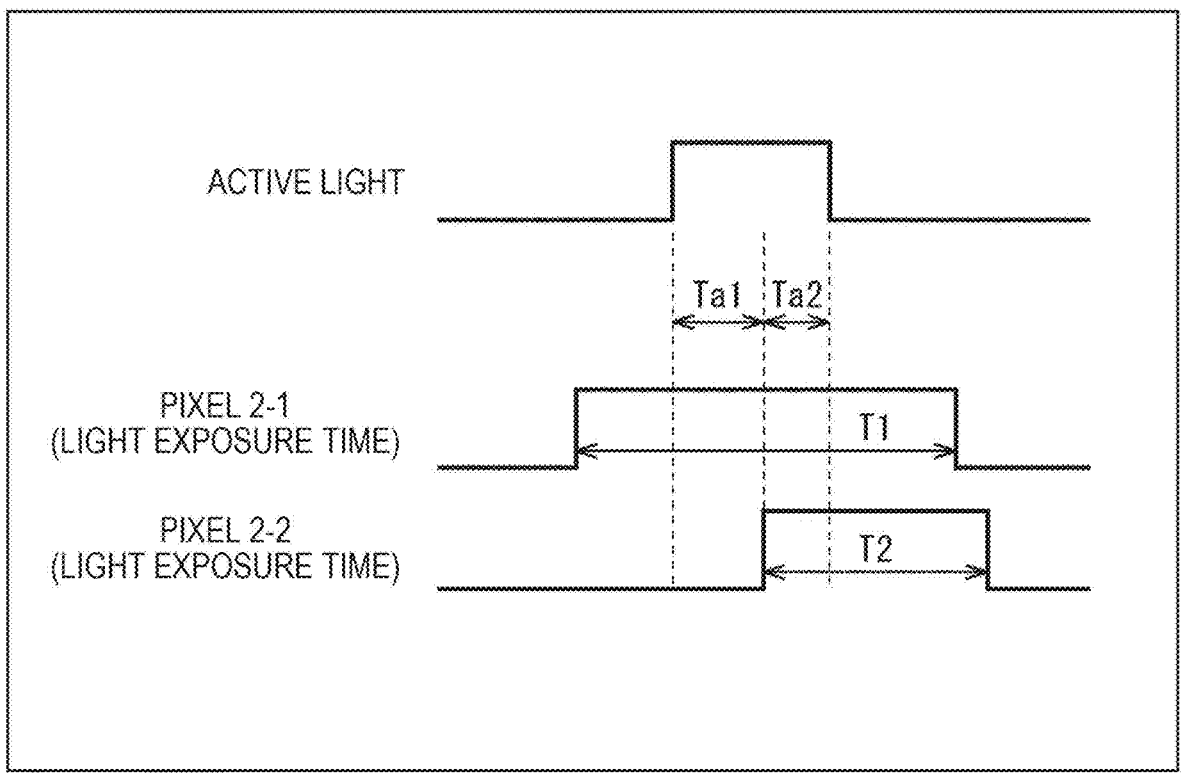
FIG. 2 is a diagram illustrating two kinds of light exposure control related to active light and pixels.

FIG. 2 is a diagram illustrating the light emission timing (the light emission time) of active light and the light exposure timing (the light exposure time) of two kinds of pixels. The active light is, for example, IR light, monochromatic light, white light, or the like, but is not limited thereto.

A pixel 2-1 and a pixel 2-2 are pixels that differ in the light exposure start timing (the light exposure start time) and the light exposure end timing (the light exposure end time) from each other. The pixel 2-1 performs long exposure operation, the light exposure time T1 of which is long. During the light exposure time of the pixel 2-1, the active light starts light emission, and completes the light emission. For example, in the example of FIG. 2, before or after the light emission of the active light, the pixel 2-1 starts light exposure, and ends the light exposure. The pixel 2-2 performs short exposure operation, the light exposure time T2 of which is shorter than the light exposure time T1 of the pixel 2-1, in the timing in which the time Ta1 has passed after the active light starts light emission (the time Ta2 until the end of irradiation remains). It should be noted that if the light exposure start timing of the pixel 2-2 is the timing in which the time Ta1 has passed after the active light starts light emission, the light exposure time may be the same as that of the pixel 2-1.

On the assumption that a signal of the pixel 2-1 is out1, a signal of the pixel 2-2 is out2, intensity of reflected light by active light is a1, intensity of background light is bg, as shown in FIG. 2, the light exposure time of the pixel 2-1 is T1, the light exposure time of the pixel 2-2 is T2, and during the light emission time of active light, the time until light exposure of the pixel 2-2 starts is Ta1, equation (1) is obtained.

[Equation 1]

$$out1 = bg \times T1 + a1 \times (Ta1 + Ta2) \quad out2 = bg \times T2 + a1 \times Ta2 \quad (1)$$

The reflected light intensity a1 by active light, and the background light intensity bg, can be determined from the above-described equation (1), and therefore it is possible to reduce the influence of reflected light.

In particular, in a case where Ta2 is 0, in other words, when the active light does not overlap the light exposure time of the pixel 2, the equation (1) is remarkably simplified. It should be noted that in a case where a ratio between the light exposure time T1 and the time Ta1+the time Ta2 is equivalent to a ratio between the light exposure time T2 and the time Ta2, calculation is difficult. Therefore, it is necessary to use values that are not equivalent to each other. In other words, the time Ta1 may be 0 (=0), or the time Ta2 may be 0 (=0). This is because in a case where the time Ta1=0, and a value of the light exposure time T1 is equivalent to that of the light exposure time T2, the ratios are equivalent to each other, which makes the calculation difficult.

It should be noted that although the pixels that differ in the light exposure time may each have the same structure, the conversion efficiency and size thereof can be changed in light of the saturated amount.

Figure 3:
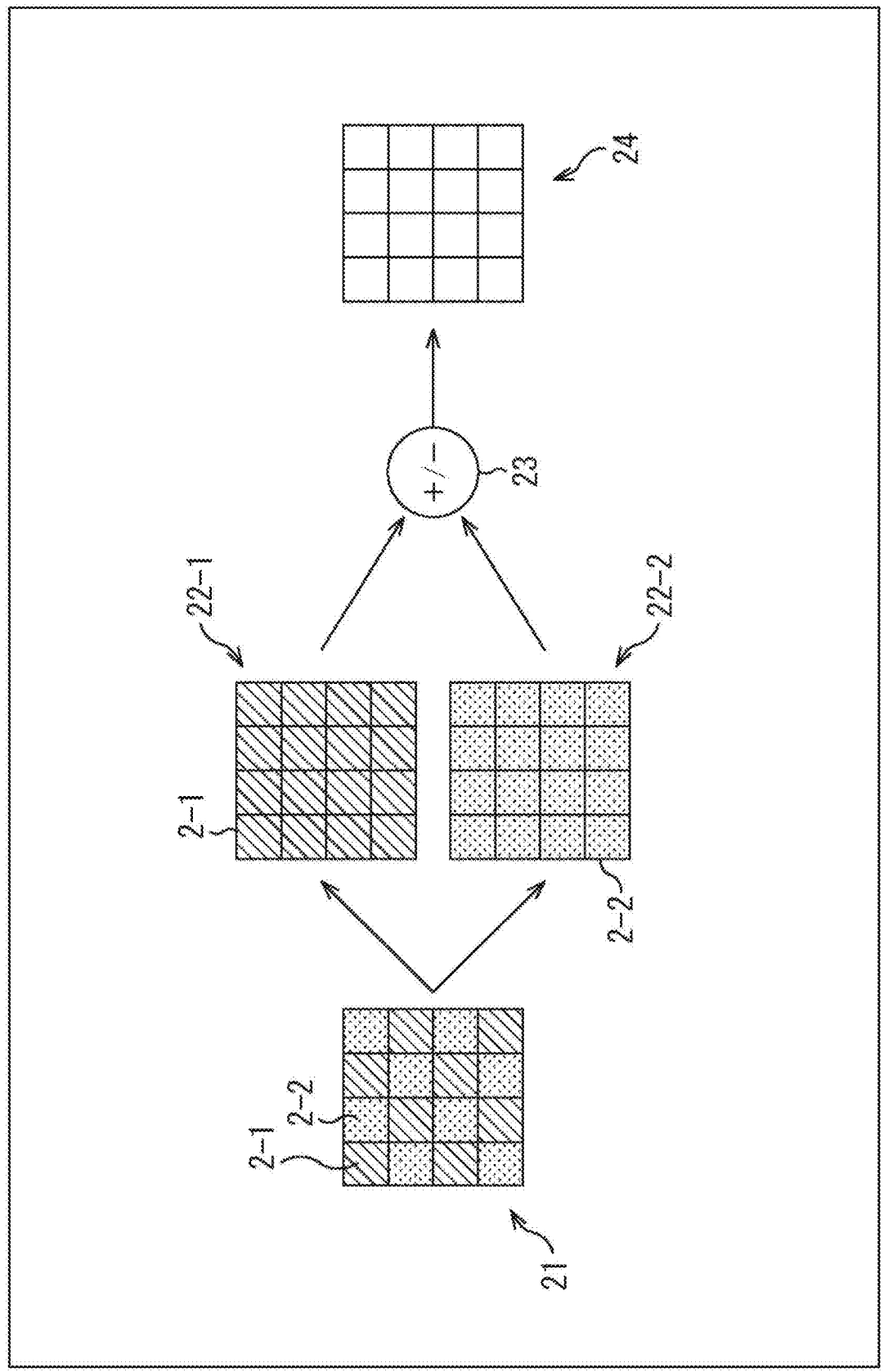
FIG. 3 is a diagram illustrating computation processing after output.

FIG. 3 is a diagram illustrating computation processing after output.

An example of FIG. 3 shows an output image 21 obtained in a case where the pixel 2-1 and the pixel 2-2 that (are controlled so as to) differ in the light exposure timing, in other words, the pixel 2-1 and the pixel 2-2 that (are controlled so as to) differ in ratio of included (input) active light, are arranged, for example, in a checkered pattern in the pixel area 3. As shown in an image 22-1 and an image 22-2, a computation unit 23 subjects this output image 21 to de-mosaic processing, and performs computation processing on a pixel basis, thereby enabling a light exposure image 24 that is exposed to active light, and from which the influence of background light is eliminated to be obtained.

As described above, computation processing can be carried out by using the feature of differing in ratio between background light and active light included in two (or a plurality of) signals. This enables one-frame complete operation, and eliminates the need for a frame memory. Further, the electric power is also low in comparison with two-frame operation.

Incidentally, with respect to a solid state image pickup element that is capable of global shuttering, all pixels share the same computing equation, and thus the computing equation is simplified. Therefore, very effective operation can be achieved as described next.

Light Exposure Operation of Pixels in the Case of Global Shutter

Figure 4:
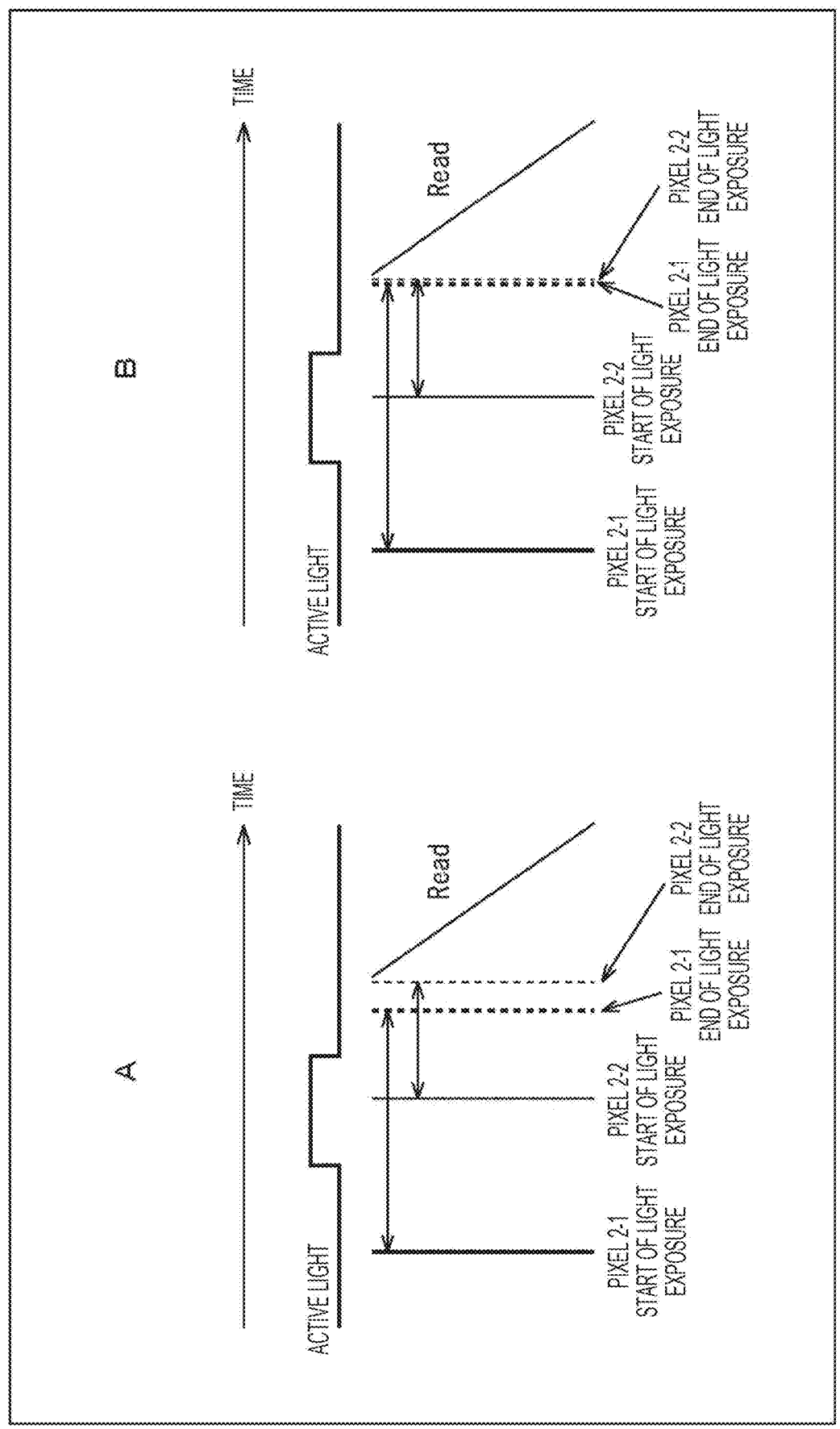
FIG. 4 is a diagram illustrating an example of light exposure operation of pixels in the case of a global shutter.

FIG. 4 is a diagram illustrating light exposure operation of pixels in the case of a global shutter. As with the example of FIG. 2 described above, A of FIG. 4 shows an example of operation obtained in a case where the light exposure start timing and the light exposure end timing are shifted.

With respect to the pixel 2-1, light exposure is started before light emission of active light is started, and the light exposure is ended after the light emission of the active light ends. Meanwhile, with respect to the pixel 2-2, light exposure is started during light emission of active light, and the light exposure is ended after the light exposure of the pixel 2-1 ends. Subsequently, reading from the pixel is performed.

Incidentally, the light exposure time is a parameter that is determined by, for example, the synchronization timing of the active light, or the light emission time of the active light capable of taking SN of the signal. Therefore, by, for example, the control circuit 8 or the like of FIG. 1, the timing can be controlled in accordance with an application to which the present technology is applied.

B of FIG. 4 shows an example of operation obtained in a case where the light exposure end timings are kept aligned with each other.

In the case of the example of B of FIG. 4, the light exposure start timings of the pixel 2-1 and the pixel 2-2 are similar to those of A of FIG. 4 respectively. However, the light exposure of the pixel 2-1 and that of the pixel 2-2 are ended in the same timing after the light emission of the active light ends.

In other words, since the light exposure time of the pixel 2-2 overlaps the light exposure time of the pixel 2-1, the total light exposure time is shortened. Therefore, the light emission time can be shortened. In addition, high adaptability to a moving object is achieved. Moreover, a frame rate improving effect produced by a decrease in useless light exposure time is expected. However, since all pixels are concurrently driven, operation that changes ending of light exposure in some cases can also be supported as appropriate.

Next, rolling shutter operation will be described. In the case of a rolling shutter, light emission of active light may overlap the pixel 2-1 on the pixel 2-2 side, or may not overlap the pixel 2-1. In addition, in the case of the rolling shutter, a coefficient for computation differs on a row basis, and therefore it is disadvantageous in that post-processing becomes complicated. However, since the pixels do not require a global shutter function, a configuration is simplified.

Light Exposure Operation of Pixels in the Case of Rolling Shutter

Figure 5:
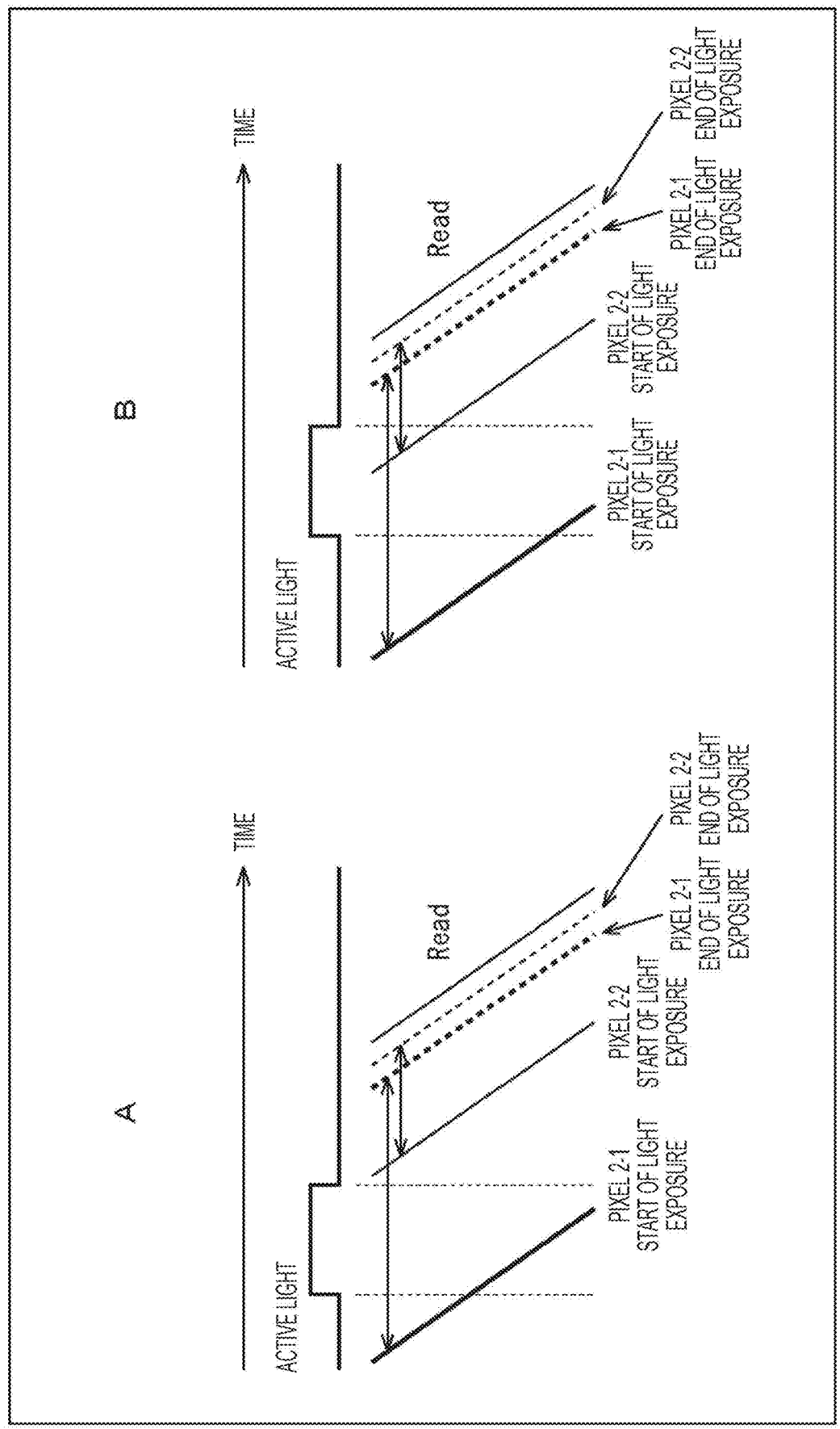
FIG. 5 is a diagram illustrating an example of light exposure operation of pixels in the case of a rolling shutter.

FIG. 5 is a diagram illustrating light exposure operation of pixels in the case of a rolling shutter. A of FIG. 5 shows an example of operation performed in a case where active light enters only the pixel 2-1.

In other words, with respect to the pixel 2-1, light exposure is started before light emission of active light is started, and the light exposure is ended after the light emission of the active light ends. Meanwhile, with respect to the pixel 2-2, light exposure is started after light emission of active light, and the light exposure is ended after the light exposure of the pixel 2-1 ends. Subsequently, reading from the pixel is performed.

In the case of the example of A of FIG. 5, even if the light exposure times of active light are not kept aligned in all areas, calculation can be performed. In addition, the light exposure time of active light differs in the pixel 2-1, and therefore computation differs on a Row basis.

B of FIG. 5 shows an example of operation performed in a case where active light enters both the pixel 2-1 and the pixel 2-2.

As with A of FIG. 5, with respect to the pixel 2-1, light exposure is started before light emission of active light is started, and the light exposure is ended after the light emission of the active light ends. Meanwhile, differently from the case of A of FIG. 5, with respect to the pixel 2-2, light exposure is started during light emission of active light, and the light exposure is ended after the light exposure of the pixel 2-1 ends. Subsequently, reading from the pixel is performed.

In this example, in a case where a part is adding operation, as described above, it is necessary to set the pixel 2-1 and the pixel 2-2 so as to differ in ratio between the active light and the total light exposure time. In a case where light enters the pixel 2-1 and the pixel 2-2, a computing equation differs on a Row basis.

Figure 6:
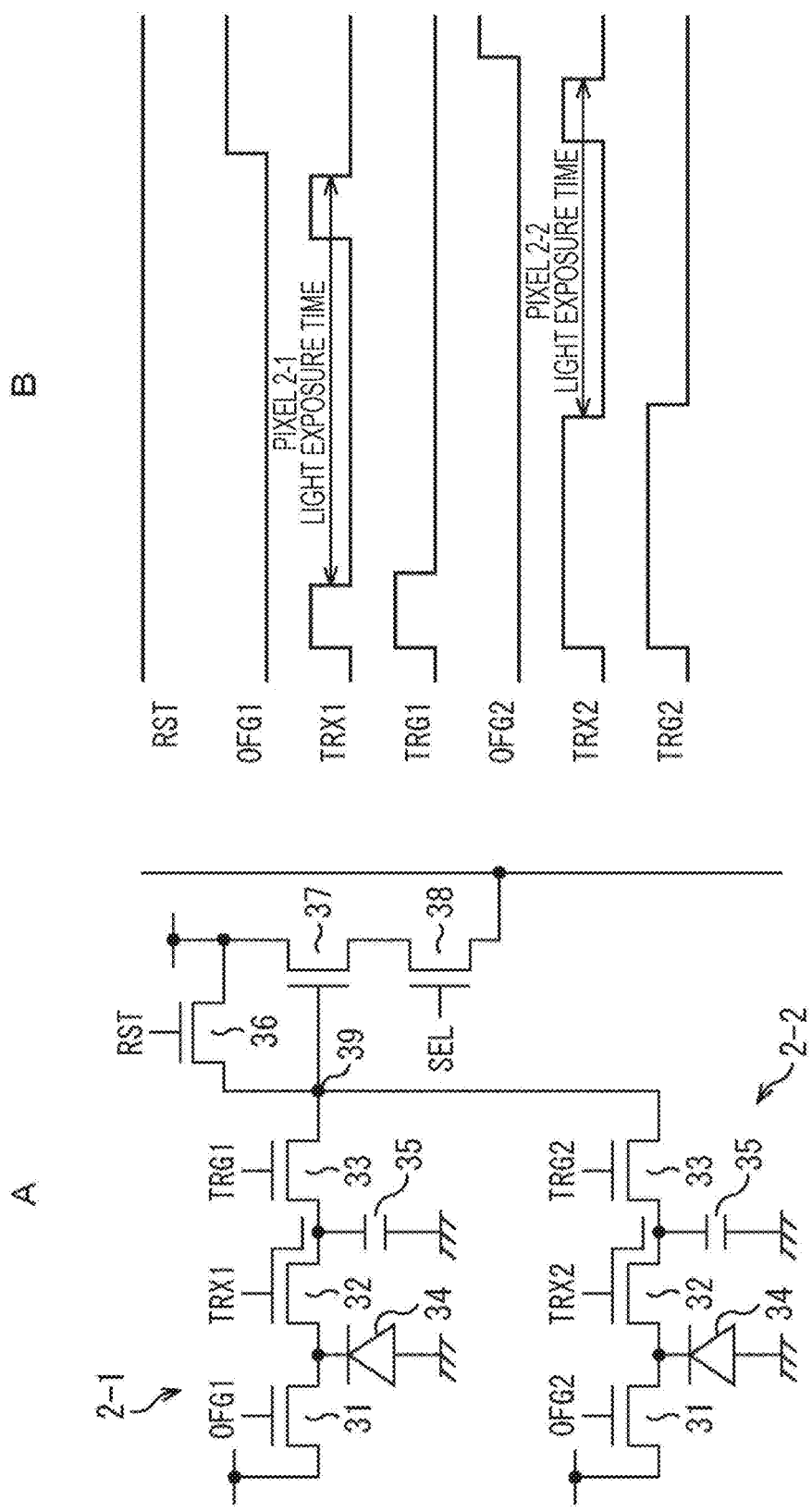
FIG. 6 is a diagram illustrating, as an example, a circuit configuration and the light exposure control timing in the case of a global shutter.

Circuit Configuration and the Light Exposure Control Timing in the Case of Global Shutter FIG. 6 shows, as an example, a circuit configuration and the light exposure control timing in the case of a global shutter. A of FIG. 6 shows, as an example, a two-pixel sharing circuit configuration in which a general-purpose embedded PD method is used, the light exposure start time in real operation is reset operation, and ending of light exposure is performed by charge transfer.

In other words, the pixel 2-1 and the pixel 2-2 each include an OFG transistor 31, a TRX transistor 32, a TRG transistor 33, a photodiode (PD) 34, and a capacitor 35. However, a RST transistor 36, an AMP transistor 37, an SEL transistor 38, and a floating diffusion (FD) 39 are shared by the pixel 2-1 and the pixel 2-2.

In the pixel 2-1, as shown in B of FIG. 6, a TRX1 signal is input into the TRX transistor 32 to perform reset operation, which causes light exposure to start. The light exposure is ended by charge transfer. Meanwhile, in the pixel 2-2, a TRX2 signal is input into the TRX transistor 32 to perform reset operation, which causes light exposure to start. The light exposure is ended by charge transfer.

Incidentally, a pulse (control signal) is shown as an example. Therefore, an example in which the timing of light exposure control is controlled by an OFG signal as described below with reference to FIG. 7 is also considered.

Figure 7:
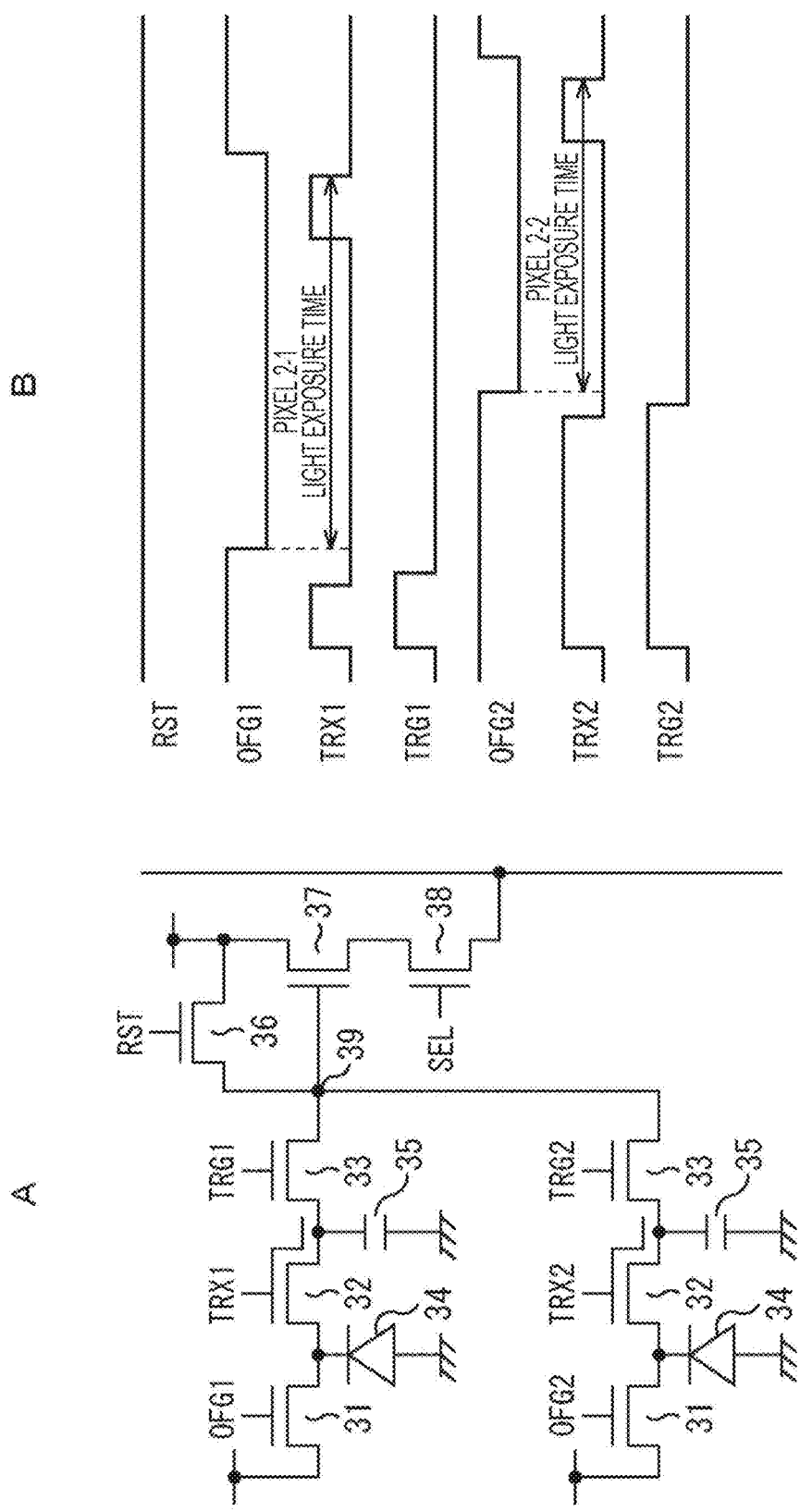
FIG. 7 is a diagram illustrating, as an example, another circuit configuration and the light exposure control timing in the case of a global shutter.

The circuit configuration shown in A of FIG. 7 is basically similar to the circuit configuration shown in A of FIG. 6, and therefore the description thereof will be omitted.

In the pixel 2-1, as shown in B of FIG. 7, an OFG1 signal is input into the OFG transistor 31 to perform reset operation, which causes light exposure to start. The light exposure is ended by charge transfer. Meanwhile, in the pixel 2-2, an OFG2 signal is input into the OFG transistor 3 to perform reset operation, which causes light exposure to start. The light exposure is ended by charge transfer.

It should be noted that although the two-pixel sharing circuit configuration is shown in the examples of FIGS. 6 and 7, no circuit sharing or four-pixel sharing or the like can also be supported. In addition, although one TRX configuration is shown in the example of FIG. 6, there can also be considered a method in which a plurality of gates (TRX1-1, TRF1-2, etc.) are arranged.

Figure 8:
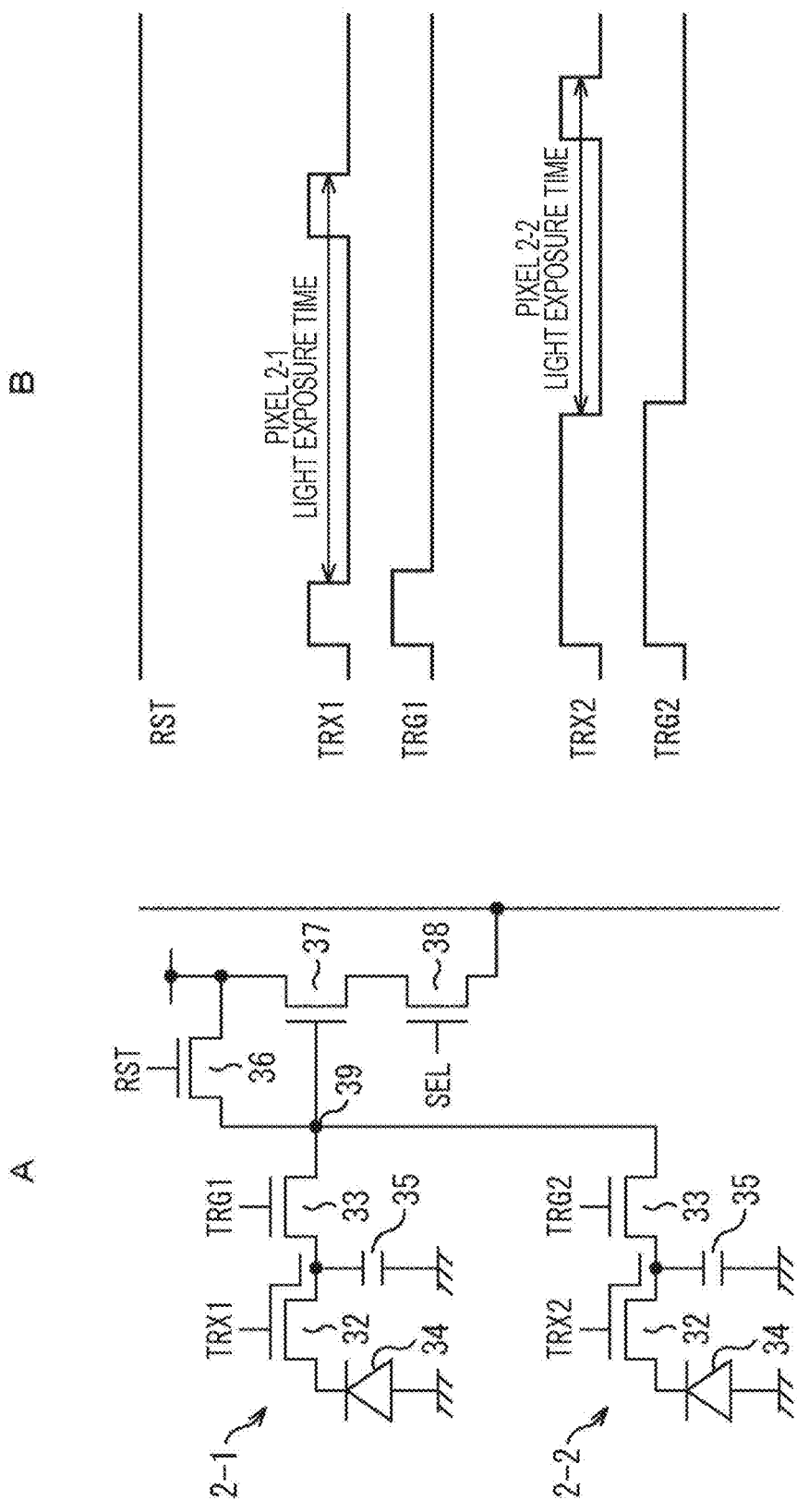
FIG. 8 is a diagram illustrating, as an example, still another circuit configuration and the light exposure control timing in the case of a global shutter.

FIG. 8 shows, as an example, another circuit configuration and the light exposure control timing in the case of a global shutter.

The circuit configuration shown in A of FIG. 8 differs from the circuit configuration shown in A of FIG. 6 in that the OFG transistor 31 is excluded from the pixel 2-1 and the pixel 2-2.

In other words, the pixel 2-1 and the pixel 2-2 each include the TRX transistor 32, the TRG transistor 33, the PD 34, and the capacitor 35. However, the RST transistor 36, the AMP transistor 37, the SEL transistor 38, and the FD 39 are shared by the pixel 2-1 and the pixel 2-2.

In the pixel 2-1, as shown in B of FIG. 8, the TRX1 signal is input into the TRX transistor 32 to perform reset operation, which causes light exposure to start. The light exposure is ended by charge transfer. Meanwhile, in the pixel 2-2, a TRX2 signal is input into the TRX transistor 32 to perform reset operation, which causes light exposure to start. The light exposure is ended by charge transfer.

In this case, since there is no OFG transistor, the flexibility of the light exposure control of the PD 34 decreases. However, the number of the transistors can be reduced.

It should be noted that although the two-pixel sharing circuit configuration is shown in the example of FIG. 8, no circuit sharing or four-pixel sharing or the like can also be supported.

Figure 9:
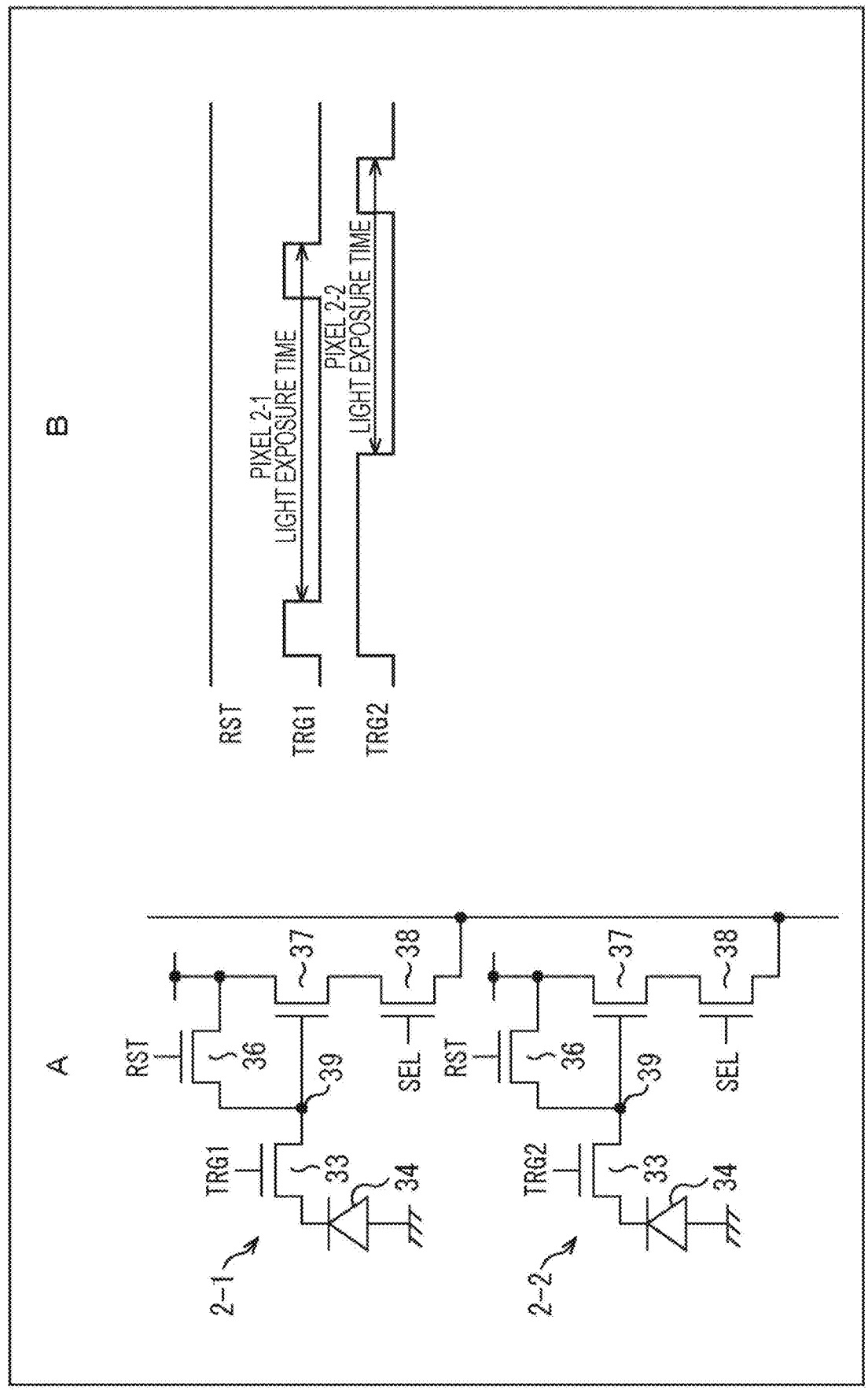
FIG. 9 is a diagram illustrating, as an example, a further circuit configuration and the light exposure control timing in the case of a global shutter.

FIG. 9 shows, as an example, still another circuit configuration and the light exposure control timing in the case of a global shutter.

As shown in A of FIG. 9, the pixel 2-1 and the pixel 2-2 each include the TRG transistor 33, the PD 34, the RST transistor 36, the AMP transistor 37, the SEL transistor 38, and the FD 39. In other words, the circuit configuration shown in A of FIG. 9 is an example of a global shutter method in which an electrical charge from the PD 34 is transferred to the FD 39. Therefore, the circuit configuration shown in A of FIG. 9 is not capable of pixel sharing.

In this case as well, in the pixel 2-1, as shown in B of FIG. 9, a TRG1 signal is input into the TRG transistor 32 to perform reset operation, which causes light exposure to start. The light exposure is ended by charge transfer. Meanwhile, in the pixel 2-2, a TRX2 signal is input into the TRX transistor 32 to perform reset operation, which causes light exposure to start. The light exposure is ended by charge transfer.

Figure 10:
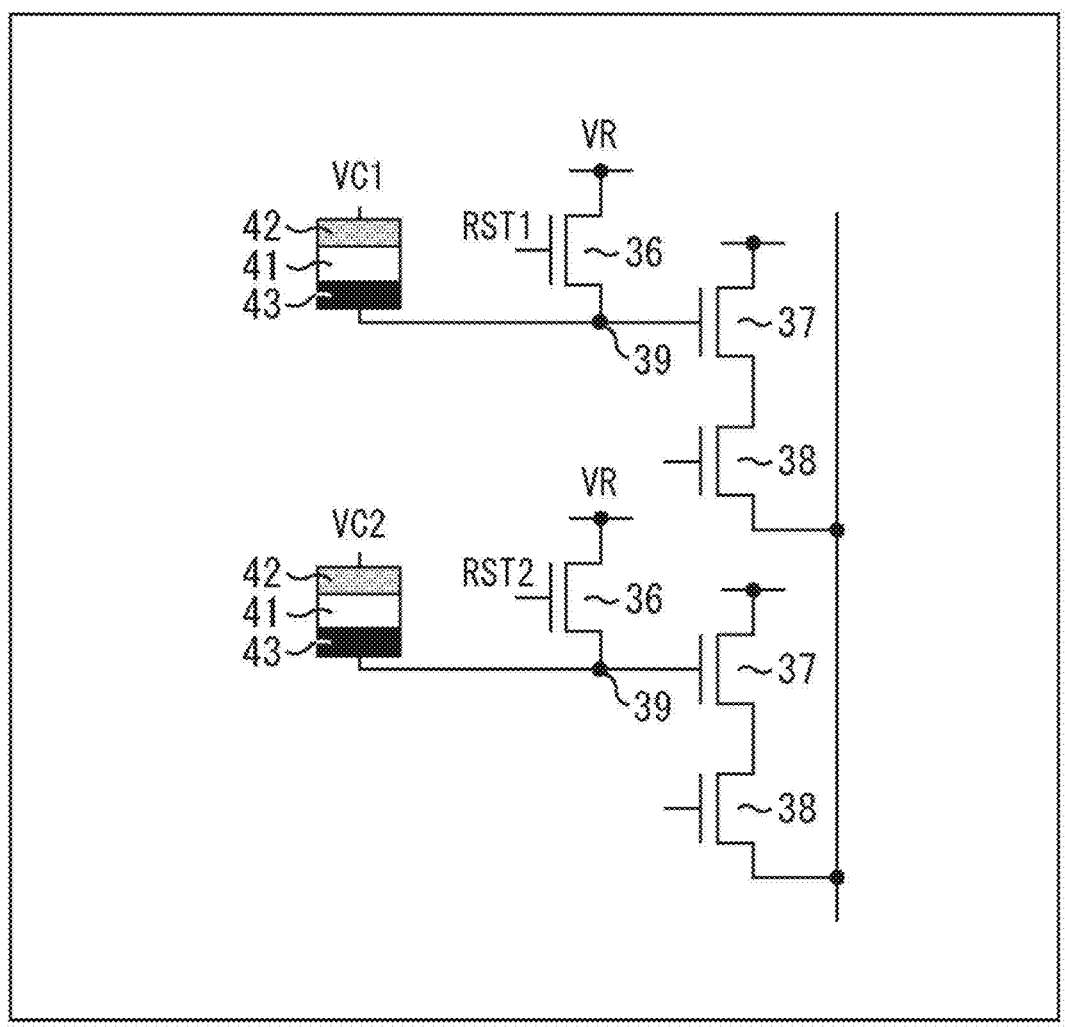
FIG. 10 is a diagram illustrating an example of a circuit configuration in the case of a global shutter that uses a photoelectric conversion film.

FIG. 10 shows an example of a circuit configuration in the case of a global shutter that uses an organic photoelectric conversion film or an inorganic photoelectric conversion film (hereinafter merely referred to as photoelectric conversion film). It should be noted that in the circuit configuration of FIG. 10, VC is a power supply voltage that is connected to a transparent electrode 42, and VR is a power supply voltage that is connected to the RST transistor 36.

The circuit configuration of FIG. 10 differs from the circuit configuration of FIG. 9 in that in the pixel 2-1 and the pixel 2-2, the PD 34 is replaced with a photoelectric conversion film 41, the transparent electrode 42, and a lower electrode 43, and the TRG transistor 33 is removed.

In other words, as shown in FIG. 10, the pixel 2-1 and the pixel 2-2 each include the photoelectric conversion film 41, the transparent electrode 42, the lower electrode 43, the RST transistor 36, the AMP transistor 37, the SEL transistor 38, and the FD 39. It should be noted that in the pixel 2-1 and the pixel 2-2, each of which has the photoelectric conversion film 41, for example, the photoelectric conversion film 41 controls a voltage of the transparent electrode 42, thereby realizing a global shutter.

In the case of the circuit configuration of FIG. 10, the following three light exposure start controls can be performed. Incidentally, starting and ending of VC input into the transparent electrode 42 is controlled by controlling a voltage of the transparent electrode 42.

Figure 11:
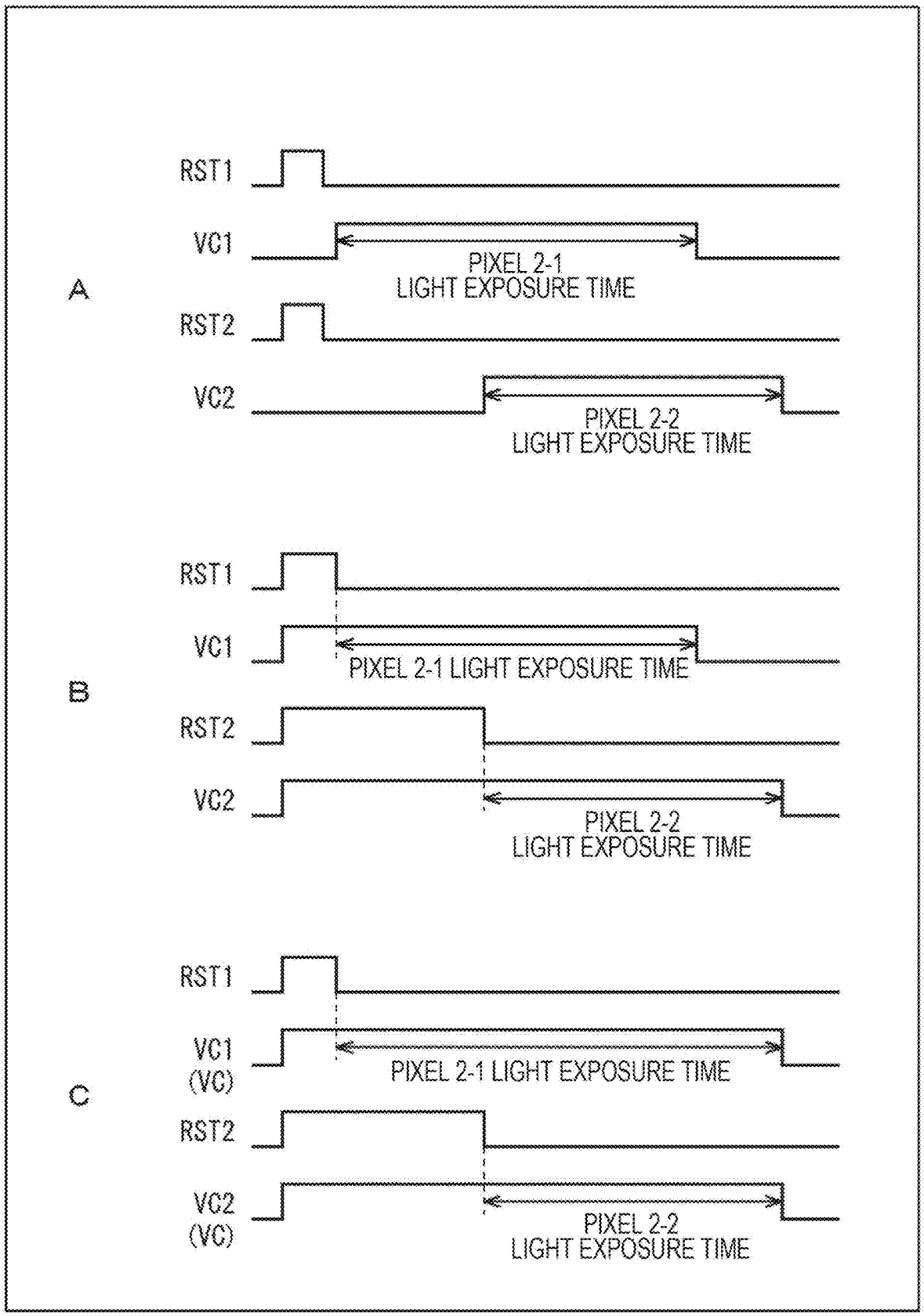
FIG. 11 is a diagram illustrating an example of the light exposure control timing in the case of FIG. 10.

In the case of A of FIG. 11, an example in which the light exposure start control is performed by the transparent electrode 42 is shown. In the pixel 2-1, light exposure is started from the timing in which the VC1 is input into the transparent electrode 42, and the light exposure is ended in the timing in which the inputting is ended. In the pixel 2-2, light exposure is started from the timing in which the VC2 is input into the transparent electrode 42, and the light exposure is ended in the timing in which the inputting is ended.

In the case of B of FIG. 11, an example in which the light exposure start control is performed by a RST signal is shown. In other words, in the pixel 2-1, light exposure is started in the timing in which the RST signal is input into the RST transistor 36, and the light exposure is ended in the timing in which inputting of the VC1 is ended. In the pixel 2-2, light exposure is started in the timing in which the RST signal is input into the RST transistor 36, and the light exposure is ended in the timing in which inputting of the VC2 is ended.

In the case of C of FIG. 11, an example in which electrodes are the same with the VC1 and the VC2 simultaneously controlled or used as VC is shown. In other words, in the pixel 2-1, light exposure is started in the timing in which the RST signal is input into the RST transistor 36, and the light exposure is ended in the timing in which inputting of the VC is ended. In the pixel 2-2, light exposure is started in the timing in which the RST signal is input into the RST transistor 36, and the light exposure is ended in the timing in which inputting of the VC is ended.

Figure 12:
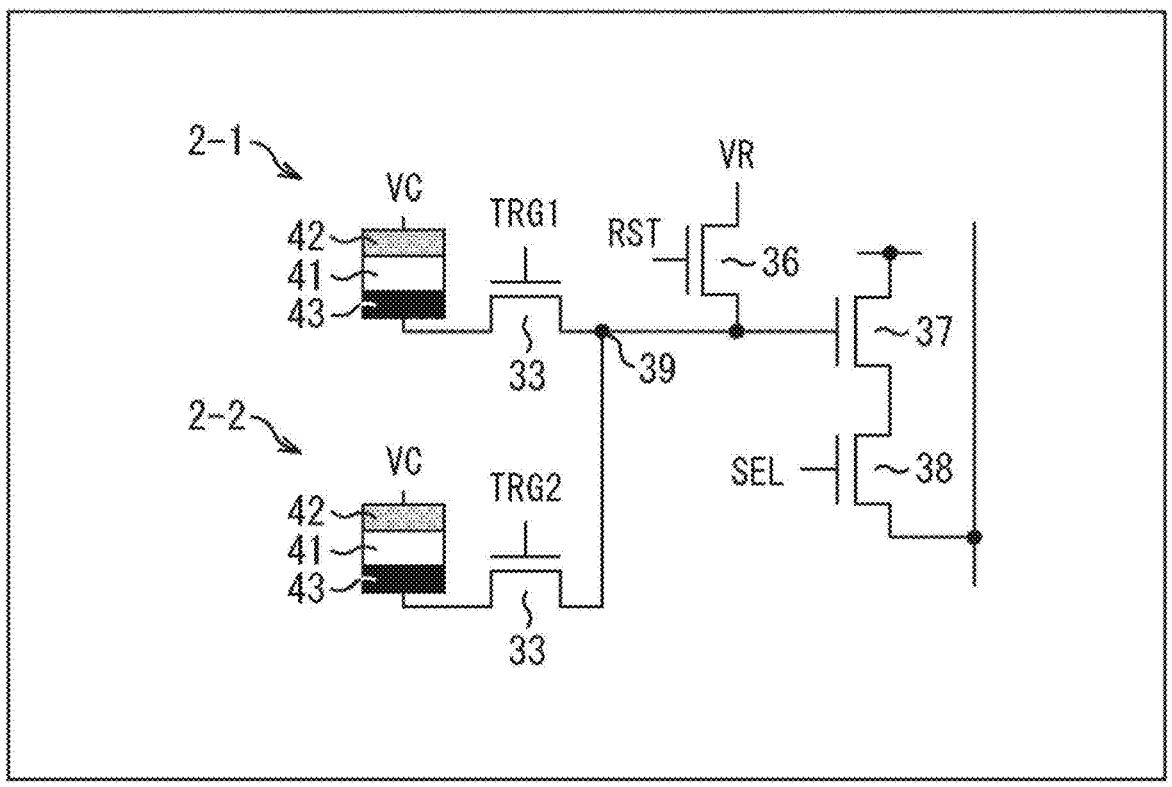
FIG. 12 is a diagram illustrating an example of another circuit configuration in the case of a global shutter that uses a photoelectric conversion film.

FIG. 12 shows an example of another circuit configuration in the case of a global shutter that uses a photoelectric conversion film. In other words, FIG. 12 shows an example of a circuit configuration used in a case where a circuit is shared.

In other words, the pixel 2-1 and the pixel 2-2 each include the photoelectric conversion film 41, the transparent electrode 42, the lower electrode 43, and the TRG transistor 33. However, the RST transistor 36, the AMP transistor 37, the SEL transistor 38, and the FD 39 are shared by the pixel 2-1 and the pixel 2-2. It should be noted that in the case of FIG. 12, although the transparent electrode 42 is illustrated in the same terminal as the VC, the transparent electrode 42 may be physically separated.

Figure 13:
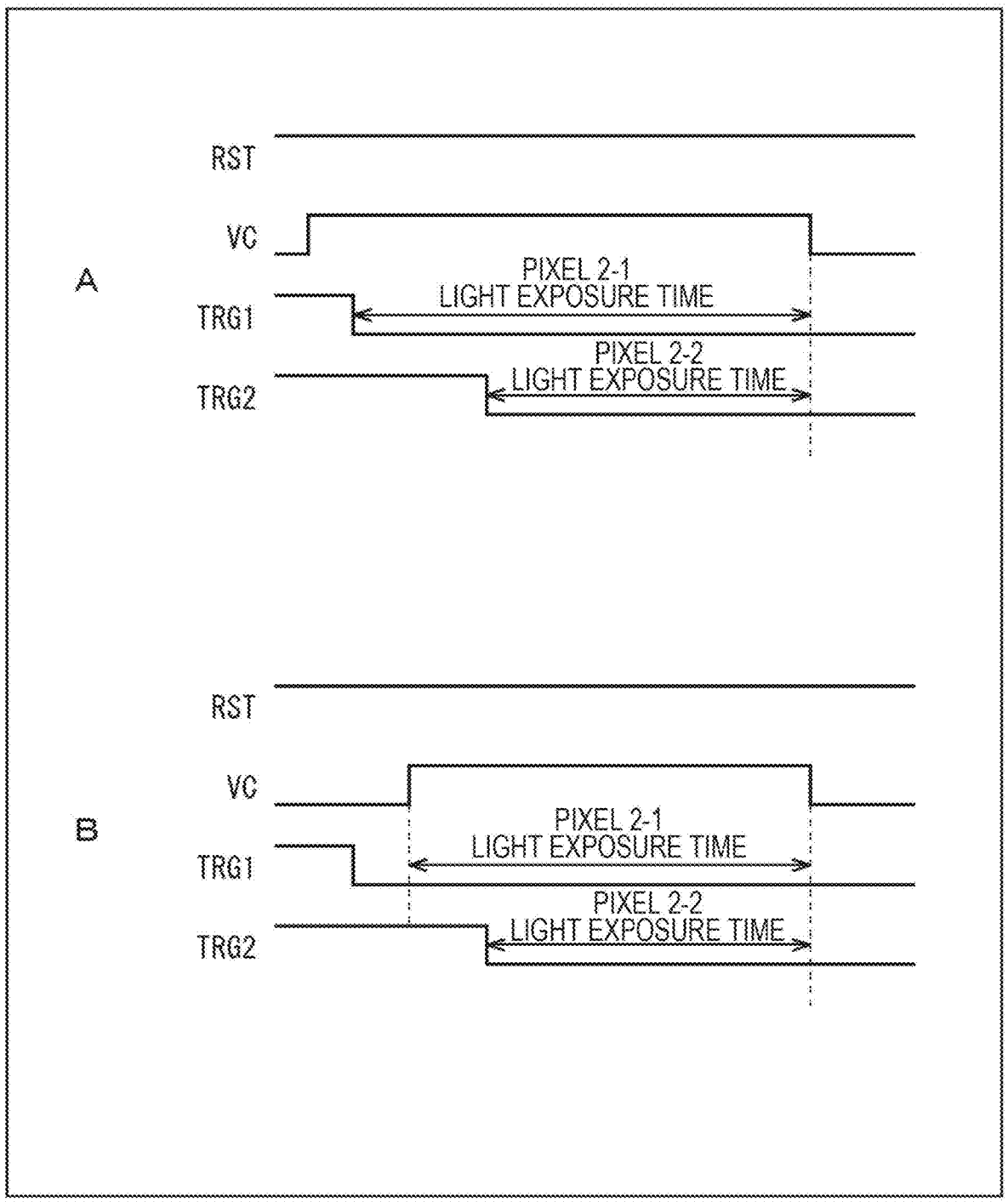
FIG. 13 is a diagram illustrating an example of the light exposure control timing in the case of FIG. 12.

In the case of A of FIG. 13, in the pixel 2-1, light exposure is started in the timing in which a TRG signal is input into the TRG transistor 33, and the light exposure is ended in the timing in which inputting of the VC is ended. In the pixel 2-2, light exposure is started in the timing in which the TRG signal is input into the TRG transistor 33, and the light exposure is ended in the timing in which inputting of the VC is ended.

It should be noted that as with the example shown in A of FIG. 13, the RST transistor 36 into which the RST signal is input may be always ON during a time period other than reading, or may be driven in a pulsed manner so as to cover an ON time period during which the TRG1 signal and the TRG2 signal are input.

In the case of B of FIG. 13, in the pixel 2-1, light exposure is started from the timing in which the VC1 is input into the transparent electrode 42, and the light exposure is ended in the timing in which the inputting is ended. In the pixel 2-2, light exposure is started in the timing in which the TRG signal is input into the TRG transistor 33, and the light exposure is ended in the timing in which inputting of the VC is ended.

In other words, B of FIG. 13 shows an example in which the light exposure start timing of one pixel is realized by a transparent electrode.

Incidentally, in the above description, the example in the case of the global shutter has been described. However, the rolling shutter can be supported by ordinary pixels, and performs general pulse operation, and therefore the description thereof will be omitted. A difference between the rolling shutter and the global shutter depends on whether or not all pixels are simultaneously exposed to light. In the case of the rolling shutter as well, the same waveform as that of the global shutter is obtained by operation of successively performing light exposure on a row basis.

2. Second Embodiment

Light Exposure Control of Pixels

Figure 14:
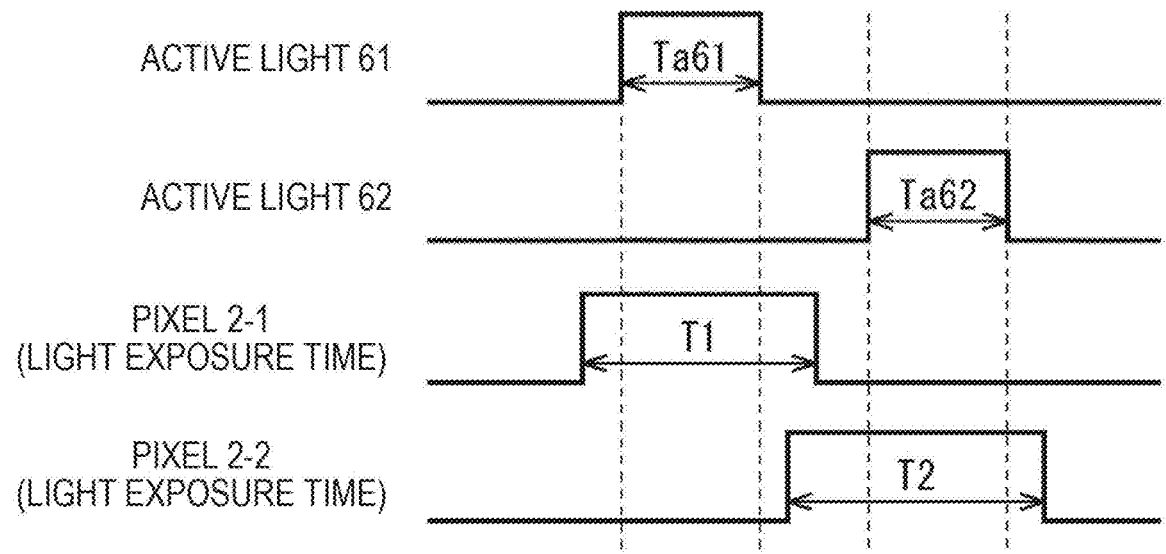
FIG. 14 is a diagram illustrating two kinds of light exposure control related to two active light beams and pixels.

FIG. 14 is a diagram illustrating the light emission timing of two kinds of active light and the light exposure timing of two kinds of pixels.

Other than the light exposure control of pixels described with reference to FIG. 2, there can also be considered a method in which what is desired to be detected is detected from a difference in absorption coefficient by using light having two wavelengths. A change in concentration of, for example, oxyhemoglobin, deoxyhemoglobin, or the like can also be calculated.

In the method that uses two wavelengths, a value cannot be determined only by two kinds of light exposure. Active light 61 and active light 62 are controlled in such a manner that only either of the active light 61 and the active light 62 enters the pixel 2-1 or the pixel 2-2. For example, in the example of FIG. 14, before or after the light emission of the active light 61, the pixel 2-1 starts light exposure, and ends the light exposure. After the light emission of the active light 61 ends, and before or after light emission of the active light 62, the pixel 2-2 starts light exposure, and ends the light exposure. It should be noted that in the case of this FIG. 14 as well, the light exposure end timings in the respective pixels 2-1 and 2-2 may be the same as each other.

As the result, a background can be subtracted. In this case, the output of the active light 61 and the output of the active light 62 cannot be separated from each other. However, a difference therebetween can be calculated.

On the assumption that a signal of the pixel 2-1 is out1, a signal of the pixel 2-2 is out2, intensity of reflected light by the active light 61 is a161, intensity of reflected light by the active light 62 is a162, intensity of background light is bg, as shown in FIG. 14, the light exposure time of the pixel 2-1 is T1, the light exposure time of the pixel 2-2 is T2, the light emission time of the active light 61 is Ta61, and the light emission time of the active light 62 is Ta62, the following equation (2) is obtained.

[Equation 2]

$$\text{out1} = bg \times T1 + a161 \times Ta61 \quad \text{out2} = bg \times T2 + a162 \times Ta62$$
$$\rightarrow \text{out1} - \text{out2} \times (T1/T2) = a161 \times Ta61 - a162 \times Ta62 \times (T1/T2) \quad (2)$$

Here, adapting T1 and T2 to be the same as each other enables calculation to be remarkably simplified. Moreover, adapting Ta61 and Ta62 to be the same as each other enables to detect only a difference in reflectance.

Incidentally, with respect to computation processing after the output in the case of FIG. 14, the computation processing is basically similar to that in the example of FIG. 3 in which computation processing after the output in the case of FIG. 2 is described. Therefore, the description thereof will be omitted.

Light Exposure Control of Pixels

Figure 15:
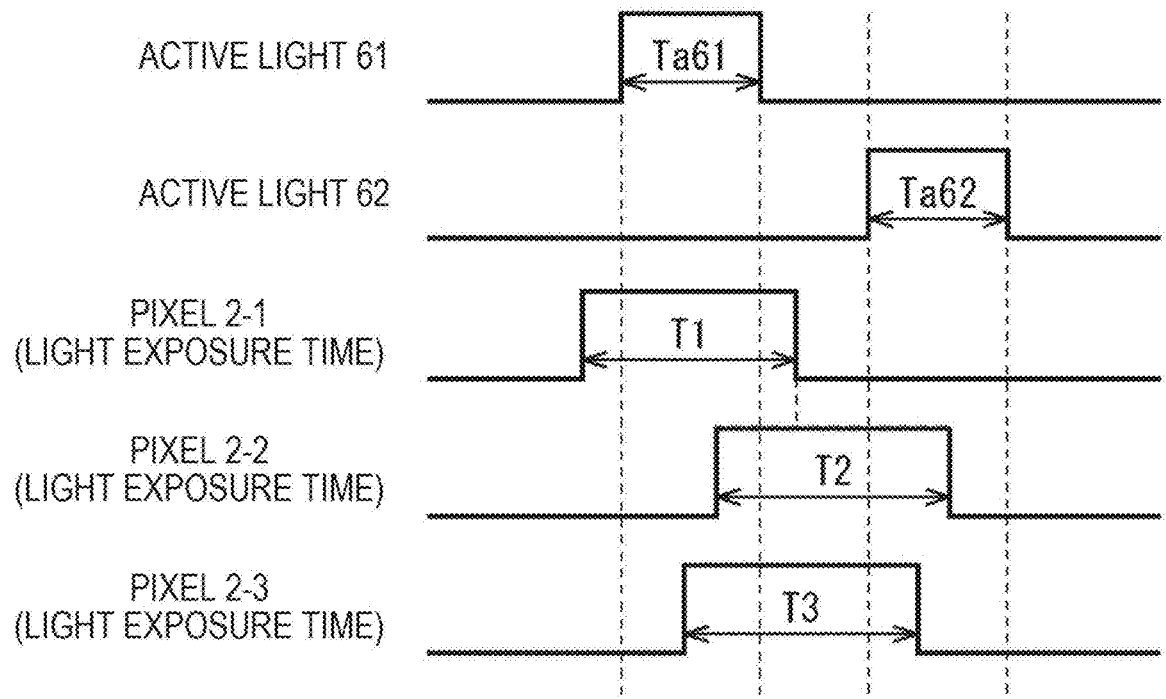
FIG. 15 is a diagram illustrating three kinds of light exposure control related to two active light beams and pixels.

FIG. 15 is a diagram illustrating the light emission timing of two kinds of active light and the light exposure timing of three kinds of pixels. It should be noted that in the case of this FIG. 15 as well, the light exposure end timings in any respective two of the pixels 2-1 to 2-3 may be the same as each other.

In a case where detection is performed more flexibly than the pixel light-exposure control described with reference to FIG. 14, on the assumption that outputs of an image 2-1, the pixel 2-2, and the pixel 2-3 are out1, out2, and out3 respectively, intensity of reflected light by the active light 61 is a161, intensity of reflected light by the active light 62 is a162, intensity of background light is bg, as shown in FIG. 15, the light exposure time of the pixel 2-1 is T1, the light exposure time of the pixel 2-2 is T2, the light exposure time of the pixel 2-3 is T3, and the times during which the lights are included in the pixels 2-N are Ta(N-61) and Ta(N-62), the following equation (3) is obtained.

[Equation 3]

$$\text{out1} = bg \times T1 + a161 \times Ta(1\text{-}61) + a162 \times Ta(1\text{-}62)$$
$$\text{out2} = bg \times T2 + a161 \times Ta(2\text{-}61) + a162 \times Ta(2\text{-}62)$$
$$\text{out3} = bg \times T3 + a161 \times Ta(3\text{-}61) + a162 \times Ta(3\text{-}62) \quad (3)$$

Under a condition in which three equations in the above-described equation (3) are not in a proportional relationship, unknown signals, bg, a161, and a162, can be calculated.

Figure 16:
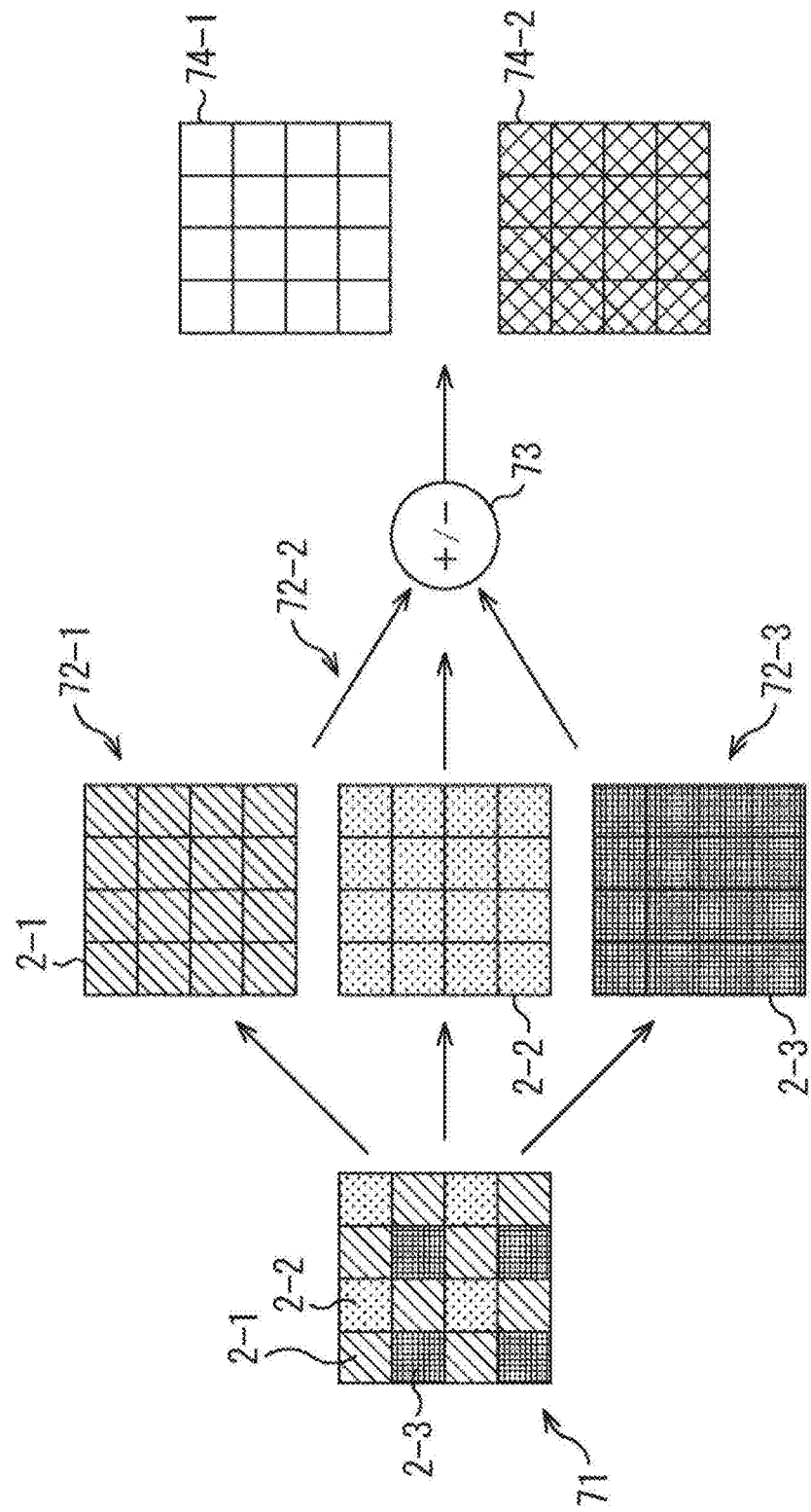
FIG. 16 is a diagram illustrating computation processing after output.

FIG. 16 is a diagram illustrating computation processing after output.

In an example of FIG. 16, the light exposure times (the timings) of the pixel 2-1, the pixel 2-2, and the pixel 2-3 among pixels of the pixel area 3 are controlled. Although three pixels may be arbitrarily selected, the three pixels are arranged as indicated in, for example, an output image 71. Pixels may be configured in units of 2×2, or various patterns, such as in units of 3×3, in units of 4×4, and in units of 2×4, can be considered.

As shown in an image 72-1, an image 72-2, and an image 72-3, this output image 71 is subjected to de-mosaic processing, and a computation unit 73 performs computation processing on a pixel basis, thereby enabling a light exposure image 74-1 that is exposed to active light 1 and a light exposure image 74-2 that is exposed to active light 2 to be obtained, the influence of background light being eliminated from the light exposure image 74-1 and the light exposure image 74-2.

Similarly, in three-pixel driving, the driving described above with reference to FIG. 15 also enables detection that uses three light sources. Moreover, by independently controlling the light exposure timings of four pixels, it is also easy to increase the number of light sources. By independently controlling N or N+1 pixels for N light sources in sequence, the influence of background light can be subtracted.

In the case of a circuit configuration in which the light exposure time can be completely independently controlled, the operations of FIGS. 13 and 14 can be easily realized. However, there is, for example, a case where a transparent electrode cannot be independently controlled. Next, this case will be described with reference to FIG. 17.

Figure 17:
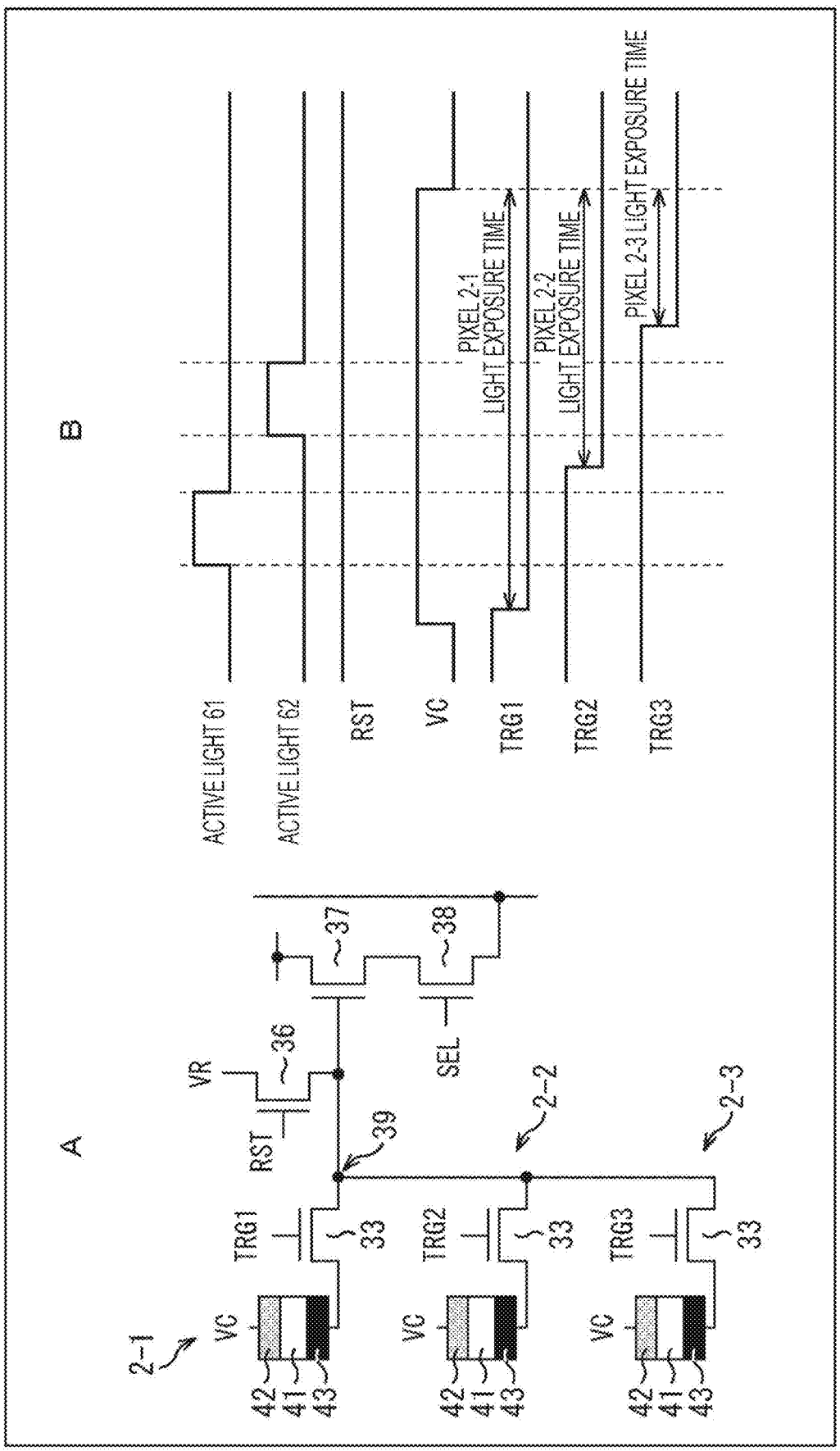
FIG. 17 is a diagram illustrating, as an example, a circuit configuration and the light exposure control timing in the case of a global shutter.

Circuit Configuration and the Light Exposure Control Timing in the Case of Global Shutter FIG. 17 shows a circuit configuration and the light exposure control timing in a case where a transparent electrode cannot be independently controlled. A of FIG. 17 shows an example of a circuit configuration in a case where a circuit is shared by three pixels.

In other words, the pixel 2-1, the pixel 2-2, and the pixel 2-3 each include the photoelectric conversion film 41, the transparent electrode 42, the lower electrode 43, and the TRG transistor 33. However, the RST transistor 36, the AMP transistor 37, the SEL transistor 38, and the FD 39 are shared by the pixel 2-1 and the pixel 2-2. It should be noted that in the case of A of FIG. 17, although the transparent electrode 42 is illustrated in the same terminal as the VC, the transparent electrode 42 may be physically separated.

As shown in B of FIG. 17, in the pixel 2-1, in the timing of inputting of the TRG1 signal after a signal is input into the transparent electrode 42 from the VC, light exposure is started before light emission of the active light 61, and the light exposure is ended in the timing in which the inputting of the VC is ended.

In the pixel 2-2, after light emission of the active light 61, and in the timing of inputting of the TRG2 signal before light emission of the active light 62, light exposure is started, and the light exposure is ended in the timing in which inputting of the VC is ended. In the pixel 2-3, after light emission of the active light 62, and in the timing of inputting of the TRG3 signal before inputting of the VC is ended, light exposure is started, and the light exposure is ended in the timing in which the inputting of the VC is ended.

Incidentally, according to the above-described light exposure control, on the assumption that outputs of the pixel 2-1, the pixel 2-2, and the pixel 2-3 are out1, out2, and out3 respectively, intensity of reflected light by the active light 61 is a161, intensity of reflected light by the active light 62 is a162, intensity of background light is bg, the light exposure time of the pixel 2-1 is T1, the light exposure time of the pixel 2-2 is T2, the light exposure time of the pixel 2-3 is T3, the light emission time of the active light 61 is Ta61, and the light emission time of the active light 62 is Ta62, the following equation (4) is obtained.

[Equation 4]

$$out1 = bg \times T1 + a161 \times Ta61 + a162 \times Ta62 \quad out2 = bg \times T2 + a162 \times Ta62 \quad out3 = bg \times T3 \quad (4)$$

The following equation (5) can be easily calculated from this equation (4).

[Equation 5]

$$a162 \times Ta62 = out2 - out3 \times (T2/T3) \quad a161 \times Ta61 = out1 - out2 - out3 \times (T1-T2)/T3 \quad (5)$$

It should be noted that in a case where the circuit configuration shown in A of FIG. 17 is applied to 2×2 square arrangement pixels, one remaining pixel among four pixels may be controlled in a manner similar to that of out3. In this case, TRG3 and 4 are driven in the same manner, and in a case where FD addition is possible, the addition is made. The signal amount of out3, the signal amount of which is small, increases, and consequently SN can be improved. In a case where FD addition is not possible, even source follower addition or addition in a digital area enables SN to be improved.

It should be noted that in the above explanation, as shown in A of FIG. 18, a checker pattern of the pixel 2-1 and the pixel 2-2, and a black-and-white sensor, are taken into consideration. However, application to other patterns and various arrays of color filters can also be considered.

For example, as shown in B of FIG. 18, there can be considered an example in which light exposure is controlled on a row basis, for example, in the order of the row of the pixel 2-1, the row of the pixel 2-2, the row of the pixel 2-1, and the row of the pixel 2-2, or an example in which light exposure is controlled on a column basis, for example, in the order of the column of the pixel 2-1, the column of the pixel 2-2, the column of the pixel 2-1, and the column of the pixel 2-2.

It should be noted that in a case where light exposure is controlled on a row basis as shown on the left side of B of FIG. 18, the control can be performed without increasing a control line.

In addition, for example, as shown in C of FIG. 18, an example in which control is performed by using a 2×2 pattern can also be considered. It should be noted that light exposure may be controlled in units of, for example, 2×2, 2×4, 4×2, 3×3, 4×4, or the like.

Figure 19:
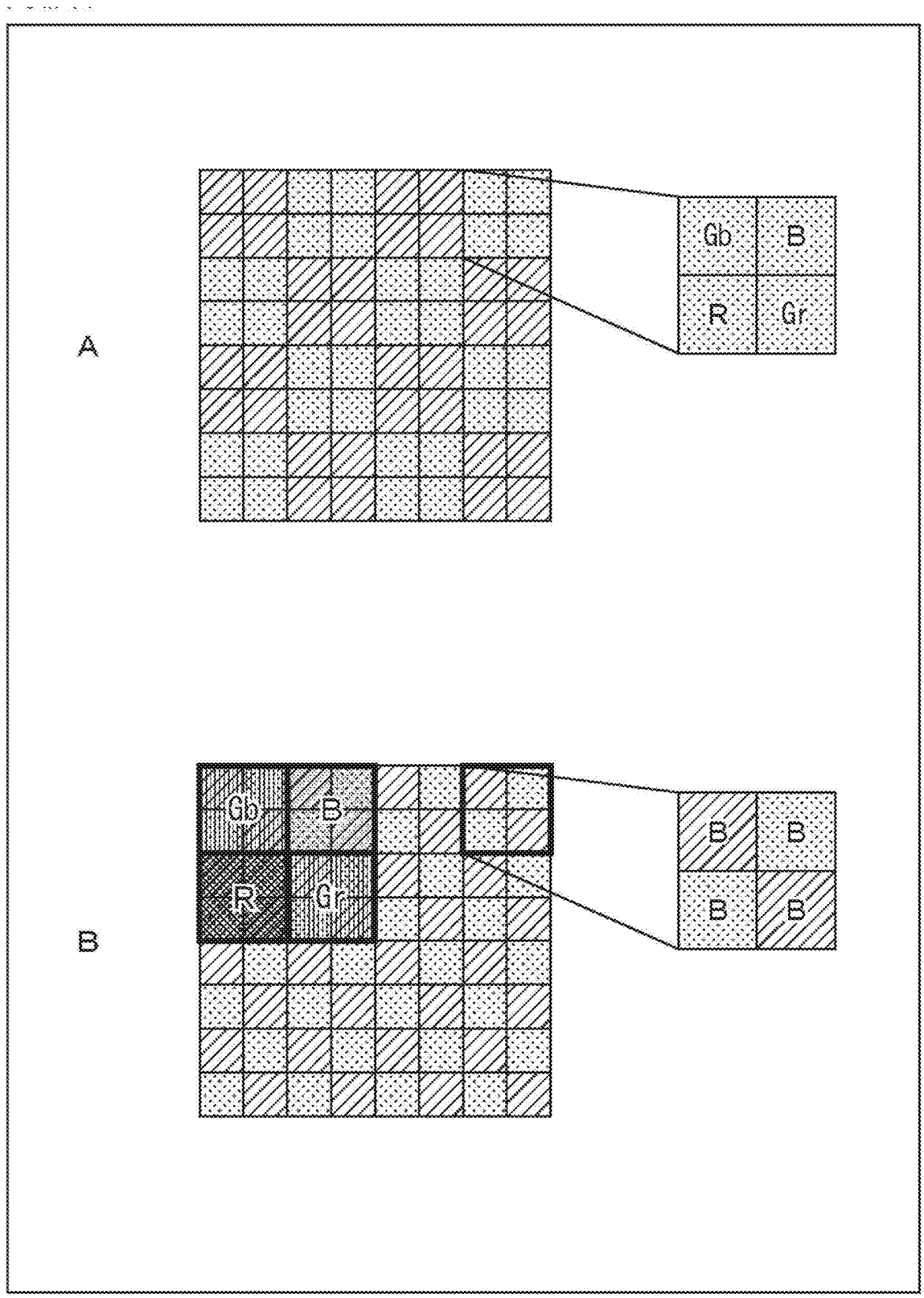
FIG. 19 is a diagram illustrating another example of a pixel pattern.

For example, as shown in A of FIG. 19, for Bayer pattern of 2×2 pixels, the light exposure time can also be controlled in units of 4×4 pixels.

Moreover, as shown in B of FIG. 19, for Bayer pattern in which 2×2 pixels share the same color filter, the light exposure time can also be controlled in the 2×2 pixels.

Figure 20:
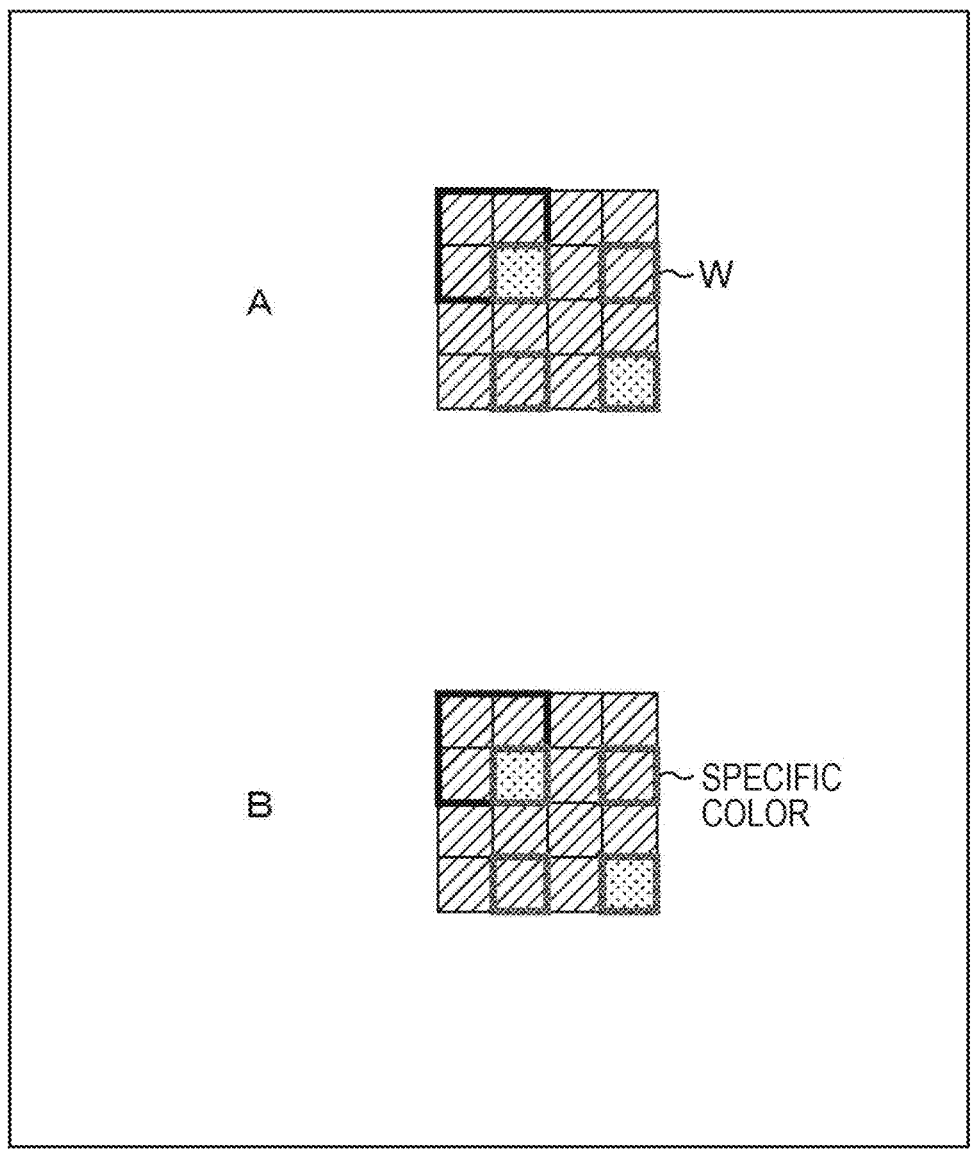
FIG. 20 is a diagram illustrating an example of another pixel pattern.

In addition, as another pixel pattern, as shown in A of FIG. 20, a filter pattern of 2×2 pixels is used in a color filter array having R, G, B, and W, and the present technology can be applied by changing the light exposure time of a pixel at a W array point.

Moreover, as shown in B of FIG. 20, in a case where light exposure is controlled by using red active light, light exposure of only a pixel corresponding to a red filter has only to be controlled. Light exposure of only a pixel corresponding to a color filter, the color of which agrees with a color of active light, can also be controlled.

Incidentally, besides the above, there are various pixel arrays such as a 3×3 color pattern, and a 4×4, 5×5, or 6×6 pixel pattern. However, as with the Bayer pattern shown in A of FIG. 19, for example, in the case of a color filter in which 6×6 pixel units are repeated, the color filter increasing randomness of a color filter array to reduce an influence such as moire, light exposure may be controlled in units of 6×6 pixels (in other words, the light exposure time of 6×6 pixels, and the light exposure time of the next 6×6 pixels, are controlled), or the control can be achieved even by controlling light exposure of the same color filter pixel included in 6×6 pixels.

Figure 21:
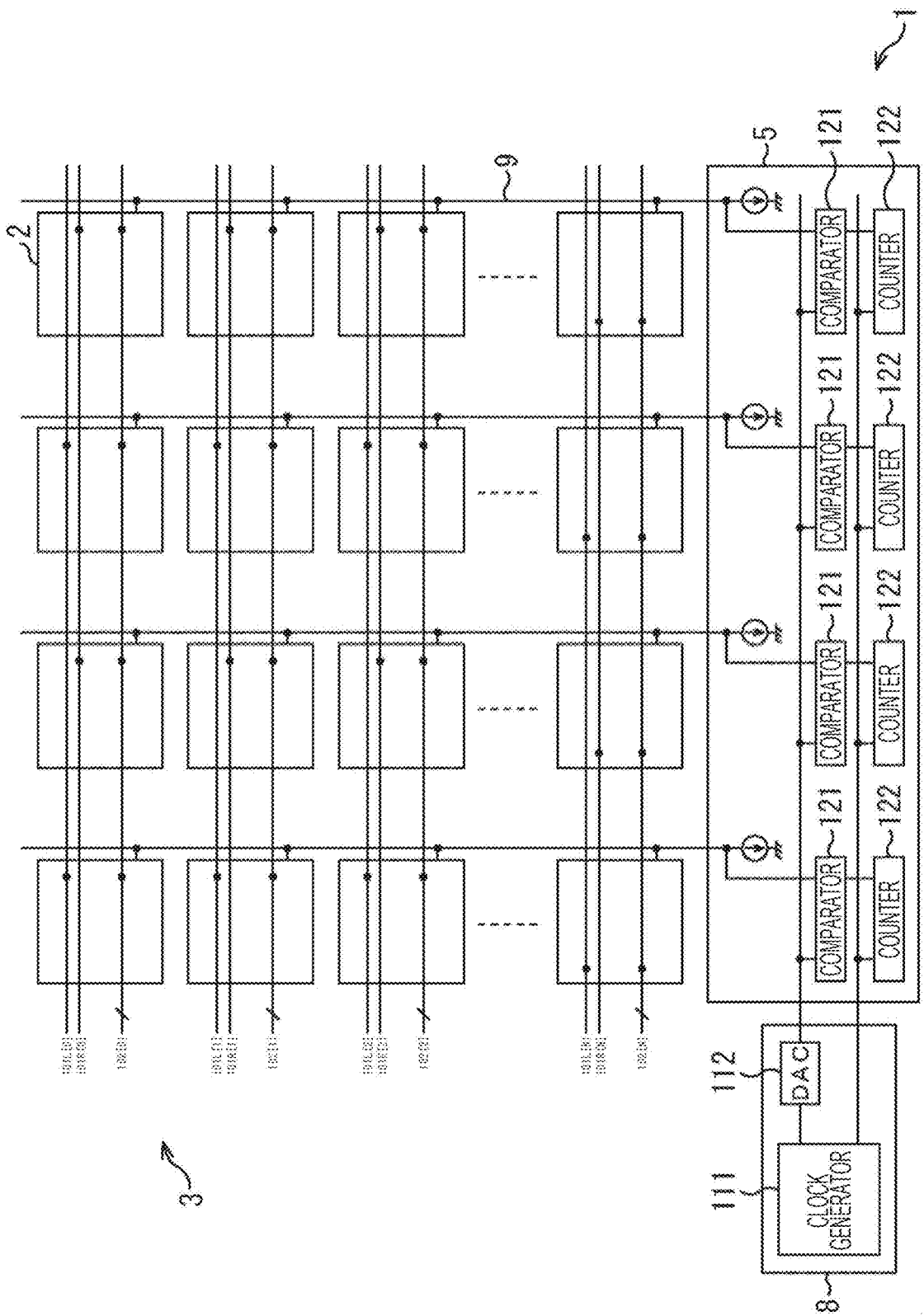
FIG. 21 is a diagram illustrating an example of a physical image of control lines.
Figure 22:
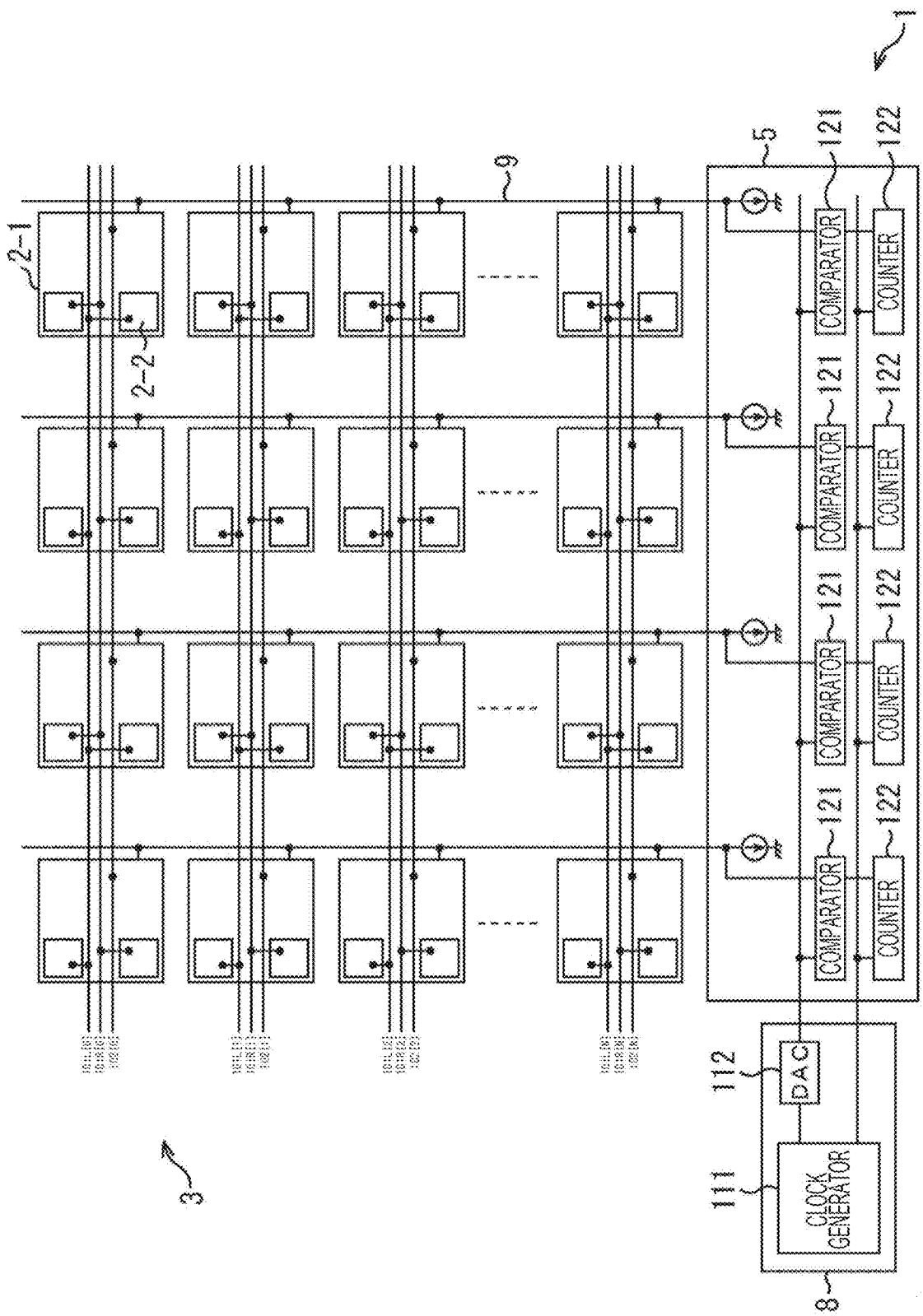
FIG. 22 is a diagram illustrating another example of a physical image of control lines.
Figure 23:
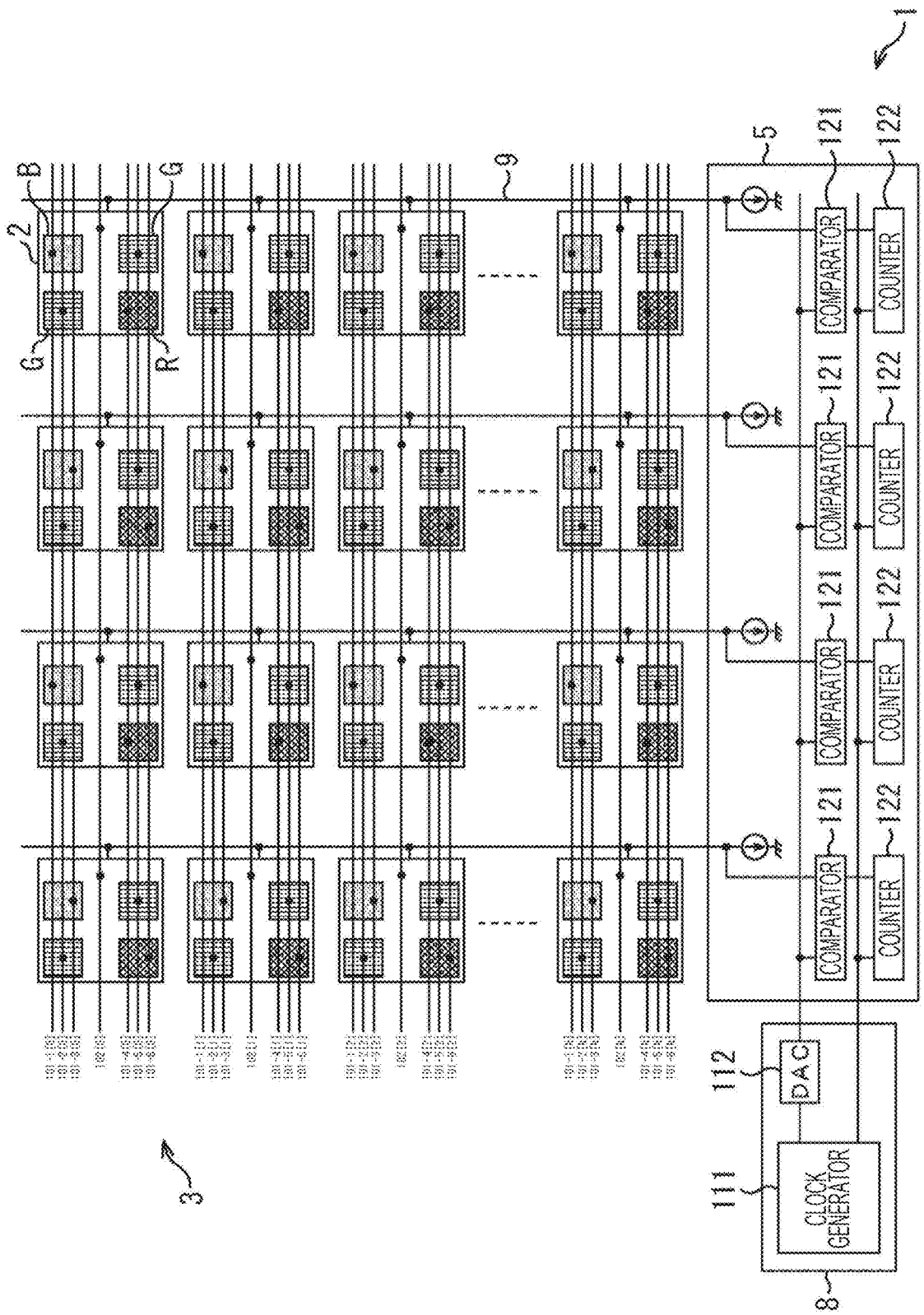
FIG. 23 is a diagram illustrating still another example of a physical image of control lines.

Physical image of control lines FIGS. 21 to 23 are diagrams each illustrating an example of a physical image of control lines.

FIG. 21 illustrates, as an example, an image of control lines in the case of one pixel one read circuit (no pixel sharing). In addition, this is an image of a black-and-white array.

In the image pickup device 1, light exposure control signal lines 101L[0] to 101L[N], light exposure control signal lines 101R[0] to 101R[0], and the other control signal lines 102[0] to[N] are wired to the pixel 2 in the pixel area 3.

The light exposure control signal lines 101L[0] to 101L[N] and the light exposure control signal lines 101R[0] to 101R[0] indicate wiring lines for controlling the light exposure time, for example, the TRG signal, the TRX signal, the OFG signal, the RST signal, or the like. Although illustrated with one line here, in a case where the light exposure time is controlled by combining the OFG signal with the TRX signal, two lines are arranged.

The other control signal lines [0] to [N] become control lines for reading signals from circuits such as the SEL transistor 38 and the RST transistor 36. The other control signal lines [0] to [N] become signals other than the light exposure control lines among all control lines.

A signal from each pixel is input, through a vertical signal line 9, into a comparator 121 that constitutes a part of an Analog/Digital (A/D) conversion circuit of the column signal processing circuit 5 of FIG. 1. The signal is then subjected to predetermined signal processing. The signal is input into, for example, the comparator 121 that constitutes a part of the A/D conversion circuit. The comparator 121 compares the input signal with a value of a DAC 112. A clock from a clock generator 111 that constitutes a part of the control circuit 8 is input into the comparator 121 by the DAC 112 as analog data, and is directly input into a counter 122.

It should be noted that RST or the like also becomes a light exposure control signal, or can also become any of other control signals. The number of wiring lines varies from 1 to 5 according to a control method.

In a case where more complicated control is performed, for example, when three or more pixels that differ in the light exposure timing are prepared, the number of light exposure control lines has only to be increased.

FIG. 22 illustrates, as an example, an image of control lines used in a case where two upper and lower pixels are shared. In addition, this is also an image of a black-and-white array.

FIG. 23 shows an example in which the present technology is applied to Bayer array. The light exposure control signal lines 101-1[0] to 101-3[0] are connected to upper pixels among four shared pixels, and the light exposure control signal lines 101-4[0] to 101-4[0] are connected to lower pixels.

In the case of the example of FIG. 23, the light exposure time can be independently controlled by two R and B in the same row, and a G pixel that is away therefrom by two rows.

It should be noted that the above description is merely an example, and the present technology can be applied to various color filter patterns. By the number of pixels for which the light exposure time is desired to be controlled, the number of light exposure control wiring lines has only to be supported corresponding to the block.

3. Third Embodiment

Other Configuration Examples

Figure 24:
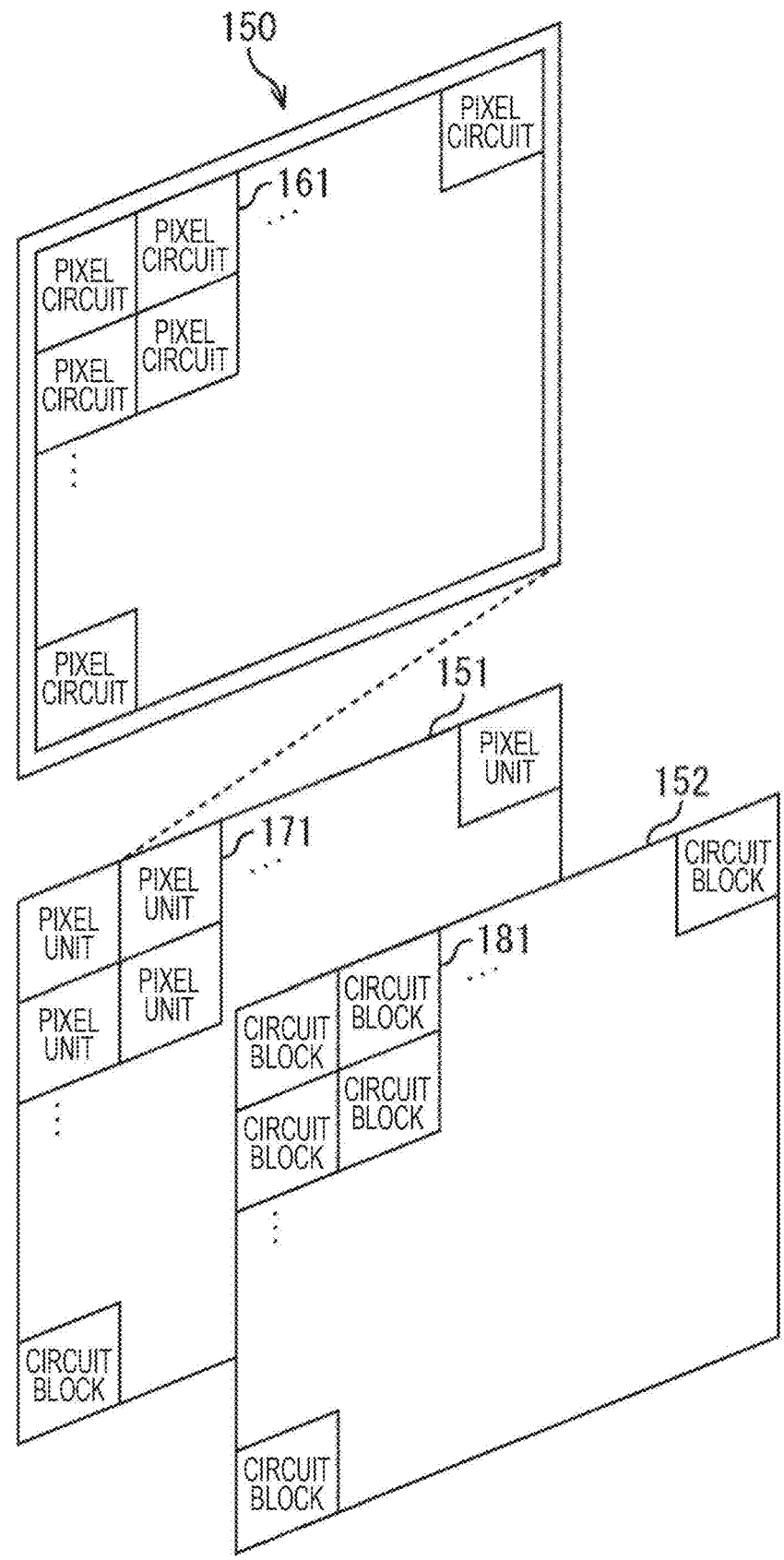
FIG. 24 is a diagram illustrating an example of another pixel area.

As other configurations, the present technology can also be applied to the image pickup device 150 such as that shown in FIG. 24, the image pickup device 150 using an area ADC method in which ADC is arranged for every two or more areas in both x and Y. It is possible to conceive of, for example, a configuration in which a pixel substrate 151 on which a plurality of pixel units 171 each having a plurality of pixel circuits 161 arranged therein are arranged, and a circuit substrate 152 on which a plurality of circuit blocks 181 corresponding to the pixel units 171 are arranged, are laminated together by micro-bump, TSV, Cu-Cu joining, or the like. The present technology can be applied to the configuration.

In addition, with respect to the pixel ADC method in which one ADC is arranged in one pixel, changing the light exposure time of each pixel enables similar support to be performed.

Figure 25:
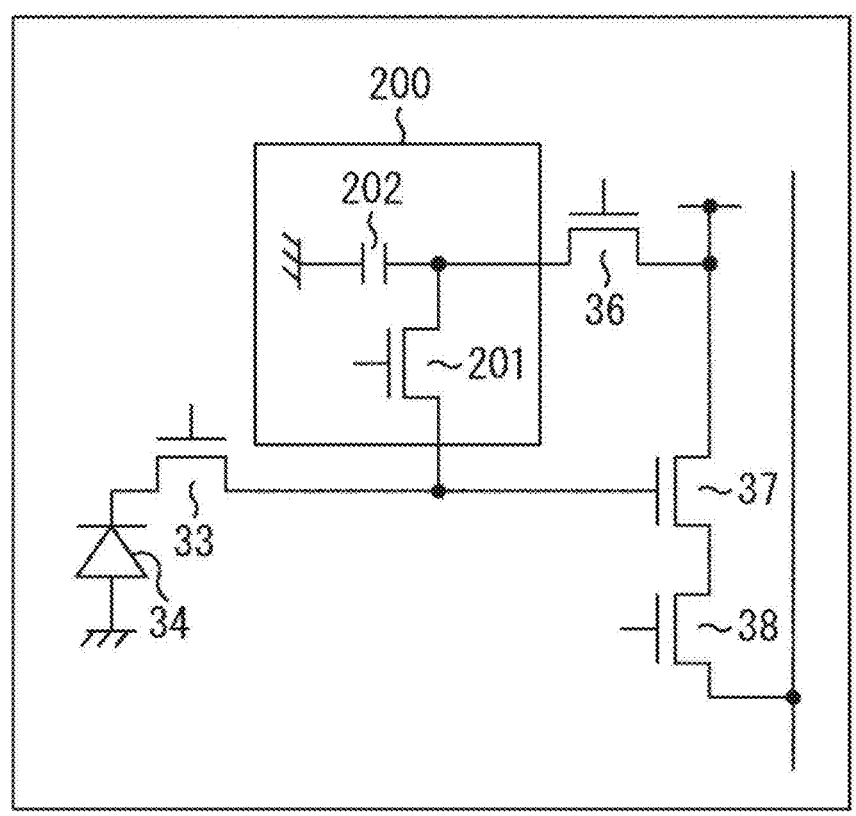
FIG. 25 is a diagram illustrating an example that includes a conversion efficiency adjustable function.

Moreover, as shown in FIG. 25, for example, a pixel circuit that includes the TRG transistor 33, the PD 34, the RST transistor 36, the AMP transistor 37, the SEL transistor 38, and the FD 39 may be combined with a conversion efficiency adjustable function 200 that includes a transistor 201 and a capacitor 202.

In this case, a conversion efficiency on the side where a signal level is low (although this is the side where the light exposure time is short, it is not always so depending on an input ratio of active light) can be increased. As the result, a signal level on the side where the signal level is low can be increased, and SN can be improved.

4. Example of Using Image Sensor

Figure 26:
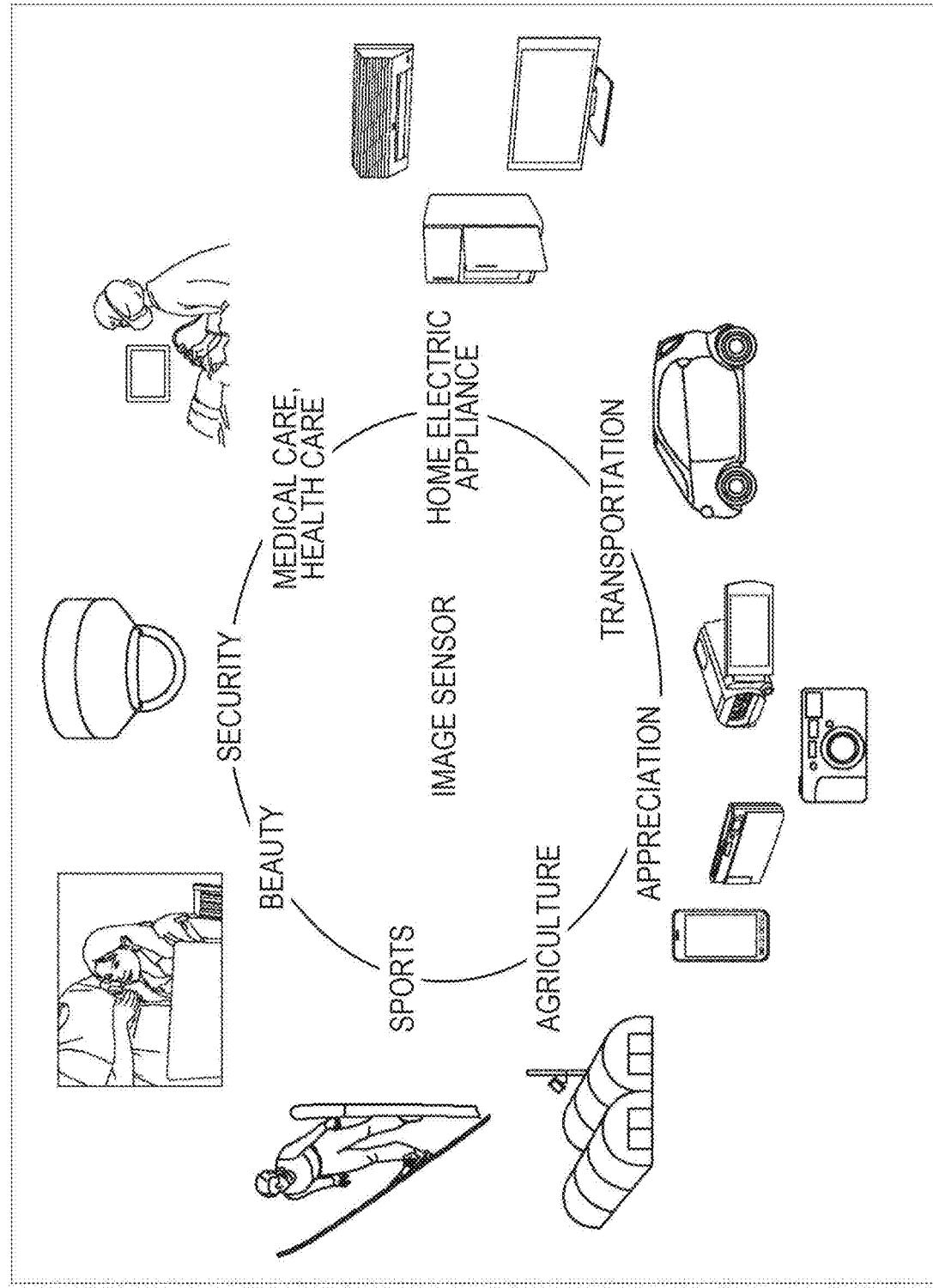
FIG. 26 is a diagram illustrating an example of using an image sensor to which the present technology is applied.

FIG. 26 is a diagram illustrating an example of using the above-described solid-state image pickup device.

The above-described solid-state image pickup device (image sensor) can be used for various cases of sensing light such as visible light, infrared light, ultraviolet light, and X-ray, for example, as described below.

- A device for taking an image for appreciation, the device including a digital camera, a portable apparatus having a camera function, and the like
- A device for traffic purposes, the device including: for example, a vehicle-mounted sensor for imaging, for example, the front and rear of an automobile, and the surrounding and inside of the automobile, for the purposes of, for example, safe driving such as automatic stop, and the recognition of a state of a driver; a monitoring camera for monitoring traveling vehicles and roads; and a distance measuring sensor for measuring, for example, a distance between vehicles A device for imaging a gesture of a user to enable apparatus operation according to the gesture to be performed, the device being used in a home electric appliance such as a TV, a refrigerator, and an air conditioner A device used for medical care or health care, the device including an endoscope, a device for taking an image of blood vessels by receiving infrared light, and the like A device for security purposes, the device including a monitoring camera for security use, a camera used for person authentication, and the like A device for beauty purposes, the device including a skin measuring instrument for imaging skin, a microscope for imaging a scalp, and the like A device for sports purposes, the device including for example, a wearable camera and an action camera that are used for sports or the like A device for agricultural purposes, the device including a camera for monitoring a state of a field and a crop, and the like 5. Example of Electronic Apparatus Configuration
Example of Electronic Apparatus Moreover, the application of the present technology is not limited to the application to the solid-state image pickup device. The present technology can also be applied to an image pickup device. Here, the image pickup device includes: a camera system such as a digital still camera and a digital video camera; and an electronic apparatus having an image pickup function, such as a portable telephone. It should be noted that there is also a case where a module-like form provided in an electronic apparatus, that is to say, a camera module, is treated as an image pickup device.

Here, a configuration example of an electronic apparatus according to the present technology will be described with reference to FIG. 27.

Figure 27:
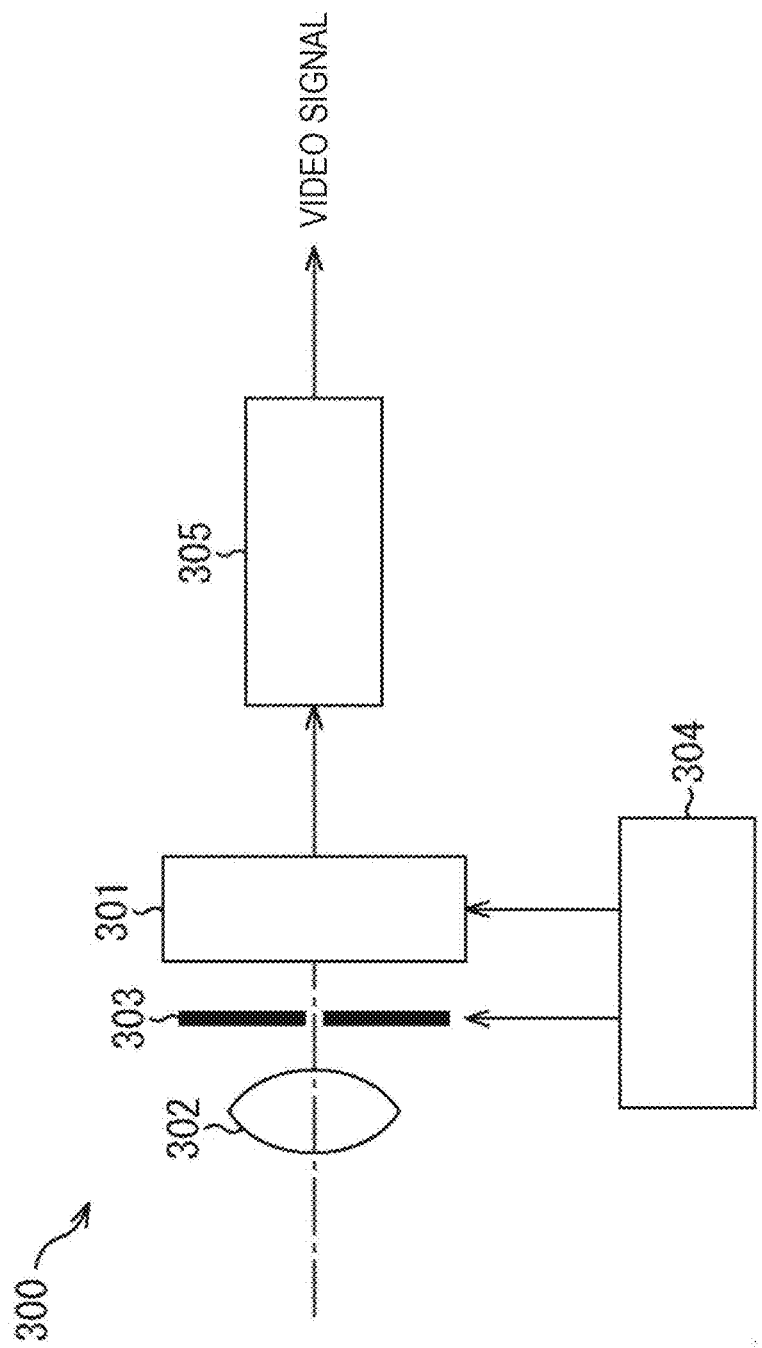
FIG. 27 is a block diagram illustrating a configuration example of an electronic apparatus to which the present technology is applied.

An electronic apparatus 300 shown in FIG. 27 is provided with a solid-state image pickup device (element chip) 301, an optical lens 302, a shutter device 303, a driving circuit 304, and a signal processing circuit 305. As the solid-state image pickup device 301, the solid-state image pickup device 1 according to the present technology described above is provided. In addition, the electronic apparatus 300 is provided with a light-emitting unit of the above-described active light as an unillustrated light-emitting unit. It should be noted that as the signal processing path 505, the computation unit 23 of FIG. 3 and the computation unit 73 of FIG. 16 are provided.

The optical lens 302 forms an image of image light (incident light) from an object on an image pickup surface of the solid-state image pickup device 301. As the result, a signal charge is accumulated in the solid-state image pickup device 301 for a fixed period of time. The shutter device 303 controls a light irradiation time period and a light shielding time period for the solid-state image pickup device 301.

The driving circuit 304 supplies driving signals for controlling the signal transfer operation of the solid-state image pickup device 301, the shutter operation of the shutter device 303, and the light-emitting operation of the unillustrated light-emitting unit. The driving circuit 304 controls each operation by using parameters set by an unillustrated CPU. The solid-state image pickup device 301 transfers a signal by the driving signal (timing signal) supplied from the driving circuit 304. The signal processing circuit 305 subjects the signal output from the solid-state image pickup device 301 to various kinds of signal processing. A video signal that has been subjected to the signal processing is stored in a storage medium such as a memory, or is output to a monitor.

6. Example of Application to Endoscopic Operation System

The technology (the present technology) according to the present disclosure can be applied to various products. For example, the technology according to the present disclosure may be applied to an endoscopic operation system.

Figure 28:
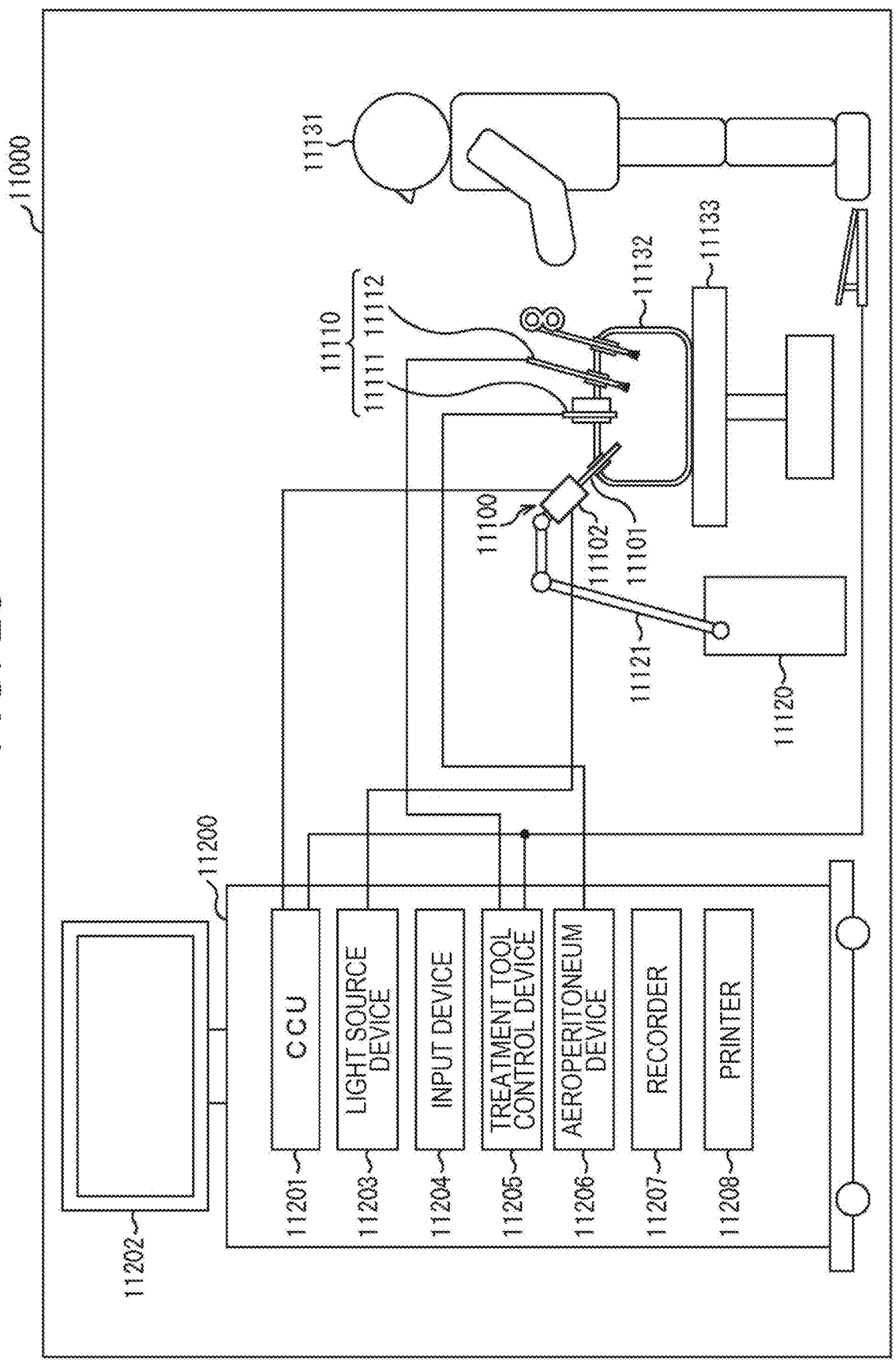
FIG. 28 is a diagram illustrating an example of a schematic configuration of an endoscopic operation system.

FIG. 28 is a diagram illustrating an example of a schematic configuration of an endoscopic operation system to which the technology (the present technology) according to the present disclosure can be applied.

FIG. 28 illustrates a state in which an operator (doctor) 11131 uses an endoscopic operation system 11000 to carry out an operation on a patient 11132 on a patient bed 11133. As Illustrated in the figure, the endoscopic operation system 11000 includes an endoscope 11100, other surgical tools 11110 such as an aeroperitoneum tube 11111 and an energy treatment tool 11112, a support arm device 11120 that supports the endoscope 11100, and a cart 11200 equipped with various devices for endoscopic surgery.

The endoscope 11100 includes a lens tube 11101 having an area that has a predetermined length from the end, and that is inserted into a body cavity of the patient 11132, and a camera head 11102 that is connected to a base end of the lens tube 11101. In the example shown in the figure, the endoscope 11100 that is configured as what is called a hard mirror having a hard lens tube 11101 is illustrated. However, the endoscope 11100 may be configured as what is called a soft mirror having a soft lens tube.

The end of the lens tube 11101 is provided with an opening into which an objective lens is fitted. A light source device 11203 is connected to the endoscope 11100. Light generated by the light source device 11203 is guided to the end of the lens tube by a light guide extended inside the lens tube 11101, and is emitted, through the objective lens, toward an observation target in the body cavity of the patient 11132. It should be noted that the endoscope 11100 may be a direct view mirror, or may be an oblique view mirror or a side view mirror.

An optical system and an image pickup element are provided inside the camera head 11102, and reflected light (observation light) from the observation target is concentrated into the image pickup element by the optical system. The observation light is photoelectrically converted by the image pickup element, and an electric signal corresponding to the observation light, in other words, an image signal corresponding to an observation image, is generated. The image signal is transmitted to a camera control unit (Camera Control Unit (CCU)) 11201 as RAW data.

The CCU 11201 includes a Central Processing Unit (CPU), a Graphics Processing Unit (GPU), and the like. The CCU 11201 controls the operation of the endoscope 11100 and the operation of the display device 11202 in a unified manner. Moreover, the CCU 11201 receives an image signal from the camera head 11102, and subjects the image signal to various image processing for displaying an image based on the image signal, for example, development processing (de-mosaic processing) or the like.

By the control from the CCU 11201, the display device 11202 displays an image based on the image signal that has been subjected to the image processing by the CCU 11201.

The light source device 11203 includes, for example, a light source such as a light emitting diode (LED), and supplies the endoscope 11100 with irradiation light used when an operated region or the like is imaged.

An input device 11204 is an input interface with the endoscopic operation system 11000. A user is allowed to input various information or an instruction into the endoscopic operation system 11000 through the input device 11204. For example, the user inputs an instruction or the like to change image pickup conditions (a kind of irradiation light, a magnification ratio, a focal length, etc.) of image pickup by the endoscope 11100.

A treatment tool control device 11205 controls driving of the energy treatment tool 11112 that is used for, for example, cauterizing or incising a tissue, or sealing a blood vessel. For the purpose of securing a visual field by the endoscope 11100, and for the purpose of securing a work space of an operator, an aeroperitoneum device 11206 sends a gas into the body cavity through the aeroperitoneum tube 11111 so as to cause the body cavity of the patient 11132 to swell. A recorder 11207 is a device that is capable of recording various information related to an operation. A printer 11208 is a device that is capable of printing various information related to an operation in various formats such as a text, an image, or a graph.

Incidentally, the light source device 11203 that supplies irradiation light used when an operated region is imaged by the endoscope 11100 can be configured from a white light source that is configured by, for example, an LED, a laser light source, or a combination thereof. In a case where the white light source is configured by a combination of RGB laser light sources, the output strength and output timing of each color (each wavelength) can be controlled with high accuracy. Therefore, white balance of a picked-up image can be adjusted in the light source device 11203. In addition, in this case, by irradiating the observation target with a laser beam from each of the RGB laser light sources by time division, and by controlling driving of an image pickup element of the camera head 11102 in synchronization with the irradiation timing, an image corresponding to each RGB can also be picked up by time division. According to the method, even if the image pickup element is not provided with a color filter, a color image can be obtained.

Further, driving of the light source device 11203 may be controlled in such a manner that light intensity of output light is changed at every predetermined time. By controlling driving of the image pickup element of the camera head 11102 in synchronization with the timing of changing the light intensity to obtain images by time division, and by synthesizing the images, an image having a high dynamic range, which is free from what is called blocked-up shadows and blown-out highlights, can be generated.

Moreover, the light source device 11203 may be configured so as to be capable of supplying light in a predetermined wavelength band corresponding to special light observation. In the special light observation, by using, for example, wavelength dependence of absorption of light in a body tissue, narrow-band light in comparison with irradiation light (that is to say, white light) at the time of ordinary observation is emitted to image a predetermined tissue such as a blood vessel of a mucous membrane surface layer with high contrast. What is called, narrow-band light observation (Narrow Band Imaging) is performed. Alternatively, in the special light observation, fluorescent observation that obtains an image by fluorescence generated by being irradiated with excitation light may be performed. In the fluorescent observation, for example, fluorescence from a body tissue can be observed (autofluorescence observation) by irradiating the body tissue with excitation light, or a fluorescent image can be obtained by locally injecting a reagent such as indocyanine green (ICG) into a body tissue, and by irradiating the body tissue with excitation light corresponding to a fluorescent wavelength of the reagent. The light source device 11203 can be configured to be capable of supplying narrow-band light and/or excitation light corresponding to such special light observation.

Figure 29:
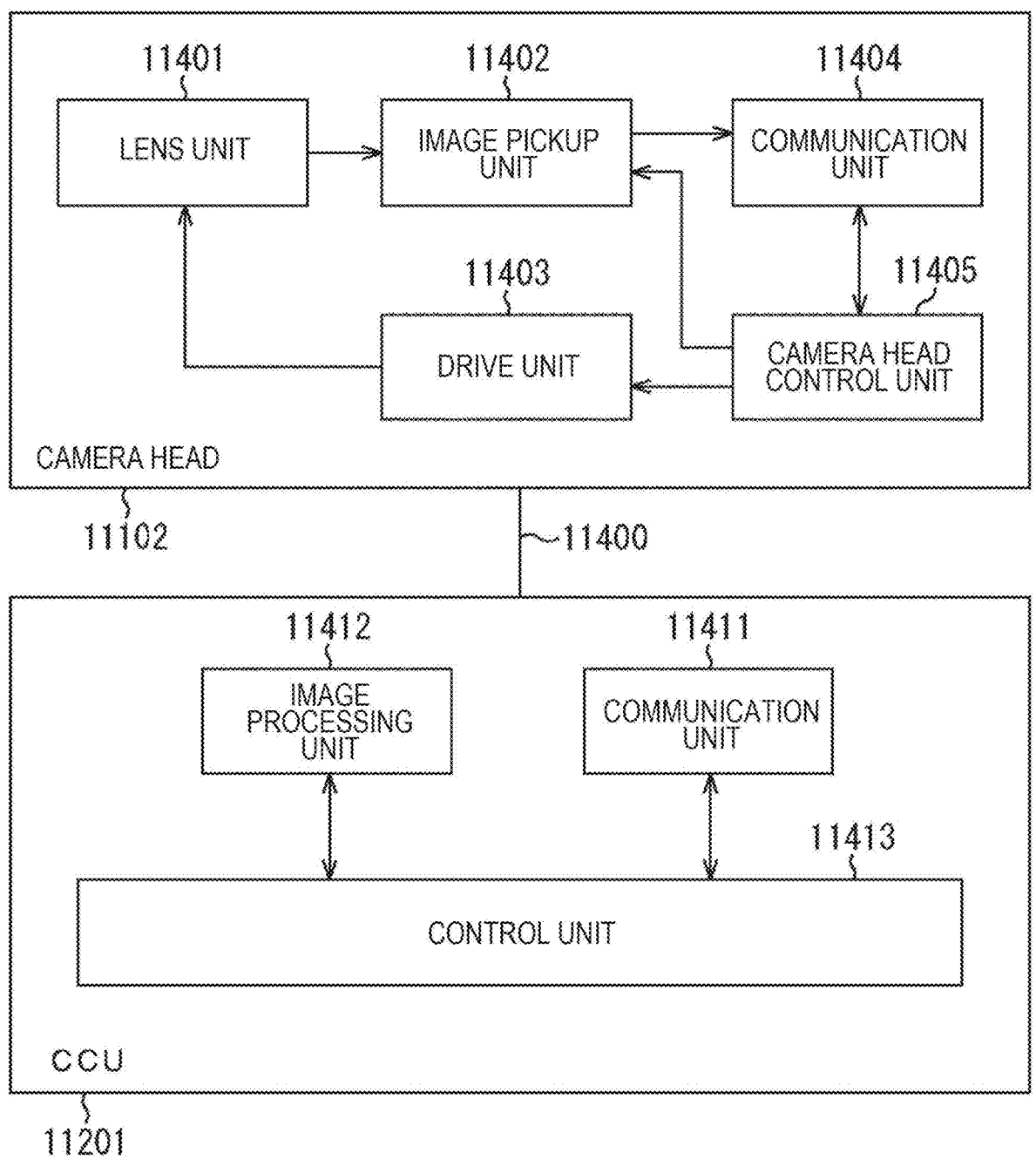
FIG. 29 is a block diagram illustrating an example of a functional configuration including a camera head and a CCU.

FIG. 29 is a block diagram illustrating an example of a functional configuration of the camera head 11102 and the CCU 11201 shown in FIG. 28.

The camera head 11102 includes a lens unit 11401, an image pickup unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected by a transmission cable 11400 so as to be capable of communicating with each other.

The lens unit 11401 is an optical system that is provided in a connection unit for connecting to the lens tube 11101. Observation light taken from the end of the lens tube 11101 is guided to the camera head 11102, and enters the lens unit 11401. The lens unit 11401 is configured by combining a plurality of lenses including a zoom lens and a focusing lens.

The number of image pickup elements that constitute the image pickup unit 11402 may be one (what is called, single plate) or two or more (what is called, multi-plate). In a case where the image pickup unit 11402 is configured by multi-plate, a color image may be obtained by generating an image signal corresponding to each RGB by, for example, each image pickup element, and by synthesizing the image signals. Alternatively, the image pickup unit 11402 may be configured so as to have a pair of image pickup elements for obtaining image signals for right and left eyes respectively, the image signals supporting 3D (dimensional) display. Performing three dimensional display enables the operator 11131 to more correctly grasp a depth of a biological tissue in an operated region. It should be noted that in a case where the image pickup unit 11402 is configured by multi-plate, the number of lens units 11401 that can be provided is also two or more in response to each image pickup element.

In addition, it is not always necessary to provide the image pickup unit 11402 in the camera head 11102. The image pickup unit 11402 may be provided, for example, inside the lens tube 11101, and immediately after the objective lens.

The drive unit 11403 is configured by an actuator. By the control from the camera head control unit 11405, the drive unit 11403 moves the zoom lens and focusing lens of the lens unit 11401 only by a predetermined distance along an optical axis. This enables the magnification ratio and focus of a picked-up image obtained by the image pickup unit 11402 to be adjusted, as appropriate.

The communication unit 11404 is configured by a communication device for transmitting and receiving various information to and from the CCU 11201. The communication unit 11404 transmits the image signal obtained from the image pickup unit 11402 to the CCU 11201 through the transmission cable 11400 as RAW data.

In addition, the communication unit 11404 receives a control signal for controlling driving of the camera head 11102 from the CCU 11201, and supplies the control signal to the camera head control unit 11405. The control signal includes, for example, information related to image pickup conditions such as: information that a frame rate of a picked-up image is specified; information that an exposure value at the time of image pickup is specified; and/or information that a magnification ratio of the picked-up image and a focus are specified.

It should be noted that the image pickup conditions such as the frame rate, the exposure value, the magnification ratio, and the focus may be specified as appropriate by a user, or may be automatically set by the control unit 11413 of the CCU 11201 on the basis of the obtained image signal. In the latter case, the endoscope 11100 is equipped with, what is called, an Auto Exposure (AE) function, an Auto Focus (AF) function, and an Auto White Balance (AWB) function.

The camera head control unit 11405 controls driving of the camera head 11102 on the basis of the control signal received from the CCU 11201 through the communication unit 11404.

The communication unit 11411 is configured by a communication device used to transmit/receive various information to/from the camera head 11102. From the camera head 11102, the communication unit 11411 receives an image signal transmitted through the transmission cable 11400.

In addition, the communication unit 11411 transmits, to the camera head 11102, a control signal for controlling driving of the camera head 11102. The image signal and the control signal can be transmitted by electrical communication, optical communication, or the like.

The image processing unit 11412 subjects the image signal that has been transmitted from the camera head 11102, and that is RAW data, to various image processing.

The control unit 11413 carries out the various control related to image pickup of an operated region or the like by the endoscope 11100, and related to displaying of a picked-up image obtained by image pickup of an operated region or the like. For example, the control unit 11413 generates a control signal for controlling driving of the camera head 11102.

Moreover, the control unit 11413 causes the display device 11202 to display the picked-up image containing the operated region or the like on the basis of the image signal that has been subjected to the image processing by the image processing unit 11412. In this case, the control unit 11413 may recognize various objects contained in the picked-up image by using various image recognition technologies. For example, by detecting a shape, a color, or the like of the edge of an object included in the picked-up image, the control unit 11413 is capable of recognizing, for example, a surgical tool such as forceps, a specific biological region, bleeding, or a mist at the time of using the energy treatment tool 11112. When the control unit 11413 causes the display device 11202 to display the picked-up image, the control unit 11413 may cause various operation support information to be displayed so as to be superimposed on an image of the operated region by using the recognition result. By displaying the operation support information in a superimposed manner to present the operation support information to the operator 11131, a load of the operator 11131 can be reduced, and the operator 11131 is enabled to make an operation progress reliably.

The transmission cable 11400 that connects between the camera head 11102 and the CCU 11201 is an electric signal cable corresponding to communication of an electric signal, an optical fiber corresponding to optical communication, or a composite cable thereof.

Here, in the example shown in the figure, the communication is wiredly performed by using the transmission cable 11400. However, the communication between the camera head 11102 and the CCU 11201 may be wirelessly performed.

The example of the endoscopic operation system to which the technology according to the present disclosure can be applied has been explained above. The technology according to the present disclosure can be applied to, for example, the endoscope 11100, (the image pickup unit 11402 of) the camera head 11102, the image processing unit 11412 of the CCU 11201, the light source device 11203, and the like, among the configurations described above. Specifically, for example, the solid-state image pickup device 1 of FIG. 1 can be applied to the image pickup unit 11402. For example, the computation unit 23 of FIG. 3 and the computation unit 73 of FIG. 16 can be applied to the image processing unit 11412. The unillustrated light-emitting unit of active light can be applied to the light source device 11203. By applying the technology according to the present disclosure to the image pickup unit 11402 and the image processing unit 11412, a clearer operated region image can be obtained, which enables an operator to reliably check an operated region. Further, as described above with reference to FIG. 14, what is desired to be detected can be detected from a difference in absorption coefficient by using light having two wavelengths, and therefore, a change in concentration or the like of, for example, oxyhemoglobin or deoxyhemoglobin can also be calculated.

It should be noted that although the endoscopic operation system has been explained as an example here, the technology according to the present disclosure may be applied to, for example, a microscopic operation system or the like besides the above.

7. Example of Application to Moving Object

The technology (the present technology) according to the present disclosure can be applied to various products. For example, the technology according to the present disclosure may be realized as a device that is provided in any kind of moving objects including an automobile, an electric vehicle, a hybrid electric vehicle, a motorcycle, a bicycle, a personal mobility, an airplane, a drone, a ship, a robot, and the like.

Figure 30:
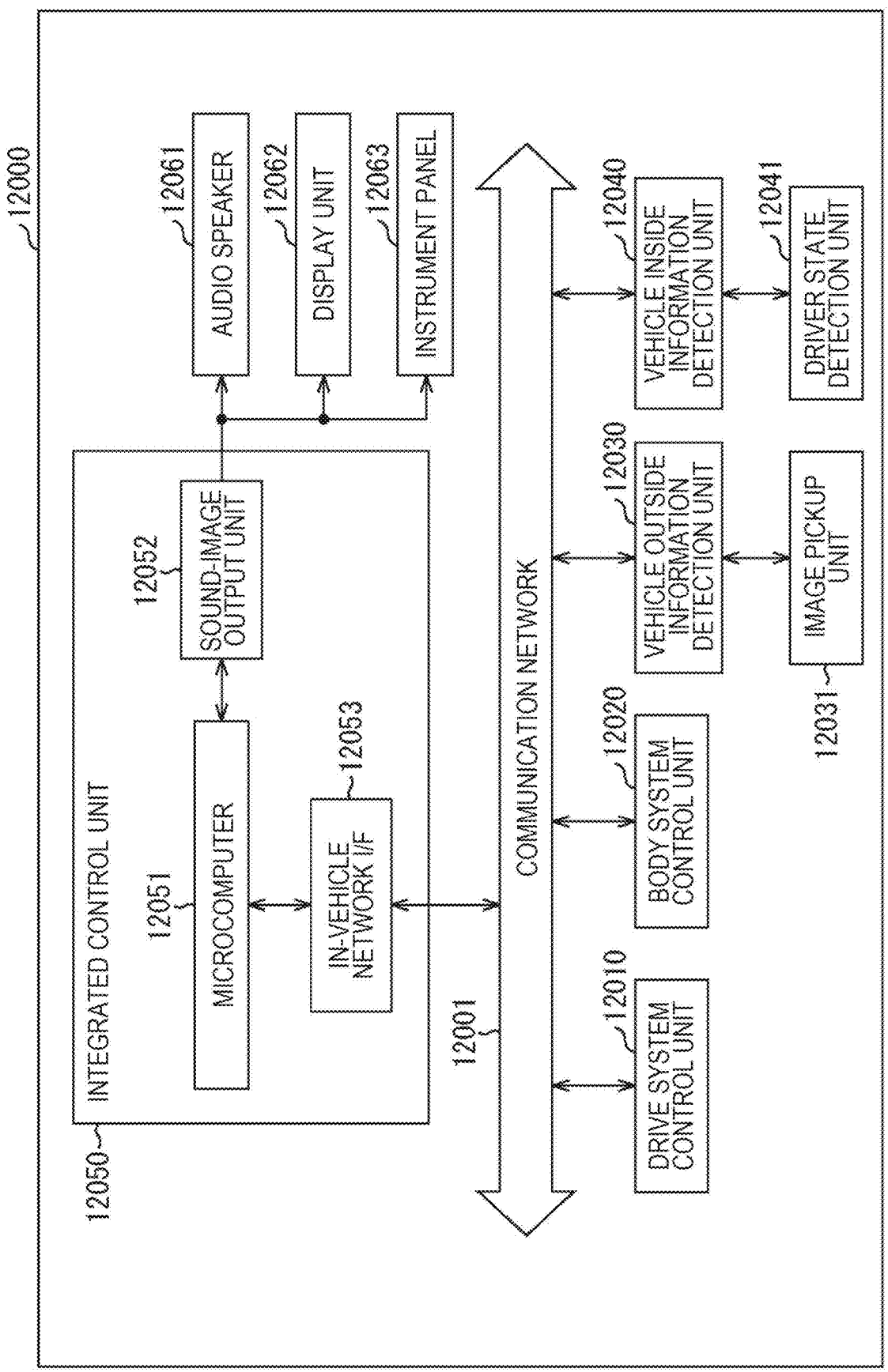
FIG. 30 is a block diagram illustrating an example of a schematic configuration of a vehicle control system.

FIG. 30 is a block diagram illustrating an example of a schematic configuration of a vehicle control system that is an example of a moving object control system to which the technology according to the present disclosure can be applied.

A vehicle control system 12000 is provided with a plurality of electronic control units that are connected through the communication network 12001. In the example shown in FIG. 30, the vehicle control system 12000 is provided with a drive system control unit 12010, a body system control unit 12020, a vehicle outside information detection unit 12030, a vehicle inside information detection unit 12040, and an integrated control unit 12050. In addition, a microcomputer 12051, a sound-image output unit 12052, and an in-vehicle network Interface (I/F) 12053 are illustrated as a functional configuration of the integrated control unit 12050.

The drive system control unit 12010 controls the operation of a device related to a drive system of a vehicle according to various kinds of programs. For example, the drive system control unit 12010 functions as a control device for: a driving force generator that generates the driving force of the vehicle, such as an internal combustion engine or a driving motor; a driving force transmission mechanism for transferring the driving force to a wheel; a steering mechanism for adjusting a rudder angle of the vehicle; a braking device that generates the braking force of the vehicle; and the like.

The body system control unit 12020 controls the operation of various kinds of devices provided in the vehicle body according to various kinds of programs. For example, the body system control unit 12020 functions as a control device for a keyless entry system, a smart key system, a power window device, or various kinds of lamps such as a head lamp, a back lamp, a brake lamp, a blinker, and a fog lamp. In this case, an electrical wave transmitted from a portable device that is substituted for a key, or signals of various switches, can be input into the body system control unit 12020. The body system control unit 12020 accepts the input of the electrical wave or the signals, and controls a door lock device, a power window device, a lamp, and the like of the vehicle.

The vehicle outside information detection unit 12030 detects information of the outside of the vehicle equipped with the vehicle control system 12000. For example, the image pickup unit 12031 is connected to the vehicle outside information detection unit 12030. The vehicle outside information detection unit 12030 causes the image pickup unit 12031 to pick up an image outside the vehicle, and receives the picked-up image. The vehicle outside information detection unit 12030 may perform object detection processing or distance detection processing of a person, a car, an obstacle, a sign, characters on a road surface, or the like on the basis of the received image.

The image pickup unit 12031 is an optical sensor that receives light to output an electric signal corresponding to the received amount of the light. The image pickup unit 12031 is also capable of outputting an electric signal as an image, and is also capable of outputting the electric signal as information of distance measurement. In addition, light received by the image pickup unit 12031 may be visible light, or may be non-visible light such as infrared rays.

The vehicle inside information detection unit 12040 detects information inside the vehicle. For example, a driver state detection unit 12041 that detects a state of a driver is connected to the vehicle inside information detection unit 12040. The driver state detection unit 12041 includes, for example, a camera for picking up an image of the driver. The vehicle inside information detection unit 12040 may calculate a fatigue degree, or a concentration degree, of the driver, or may determine whether or not the driver is dozing, on the basis of detection information input from the driver state detection unit 12041.

The microcomputer 12051 is capable of computing a control target value of the driving force generator, the steering mechanism, or the braking device on the basis of information inside or outside the vehicle, which is obtained by the vehicle inside information detection unit 12040 or the vehicle outside information detection unit 12030, and is capable of outputting a control instruction to the drive system control unit 12010. For example, the microcomputer 12051 is capable of performing cooperative control for the purpose of realizing a function of an Advanced Driver Assistance System (ADAS) including the vehicle collision avoidance or shock mitigation, follow-up traveling based on a distance between vehicles, vehicle-speed maintaining traveling, a vehicle collision warning, a vehicle lane deviation warning, or the like.

In addition, by controlling the driving force generator, the steering mechanism, the braking device, or the like on the basis of information around the vehicle, which is obtained by the vehicle outside information detection unit 12030 or the vehicle inside information detection unit 12040, the microcomputer 12051 is capable of performing cooperative control for the purpose of, for example, automatic driving that causes a vehicle to autonomously travel without depending on driver's operation.

Moreover, the microcomputer 12051 is capable of outputting a control instruction to the body system control unit 12030 on the basis of information outside the vehicle obtained by the vehicle outside information detection unit 12030. For example, the microcomputer 12051 controls a head lamp according to a position of a preceding vehicle or an oncoming vehicle, which is detected by the vehicle outside information detection unit 12030, thereby enabling cooperative control for the purpose of taking anti-glare measures, for example, switching high-beam to low-beam to be performed.

The sound-image output unit 12052 transmits at least one of an audio output signal or an image output signal to an output device that is capable of visually or audibly notifying passengers of the vehicle or persons outside the vehicle of information. In the example in FIG. 30, an audio speaker 12061, a display unit 12062, and an instrument panel 12063 are presented as output devices. The display unit 12062 may include at least one of, for example, an on-board display or a head-up display.

Figure 31:
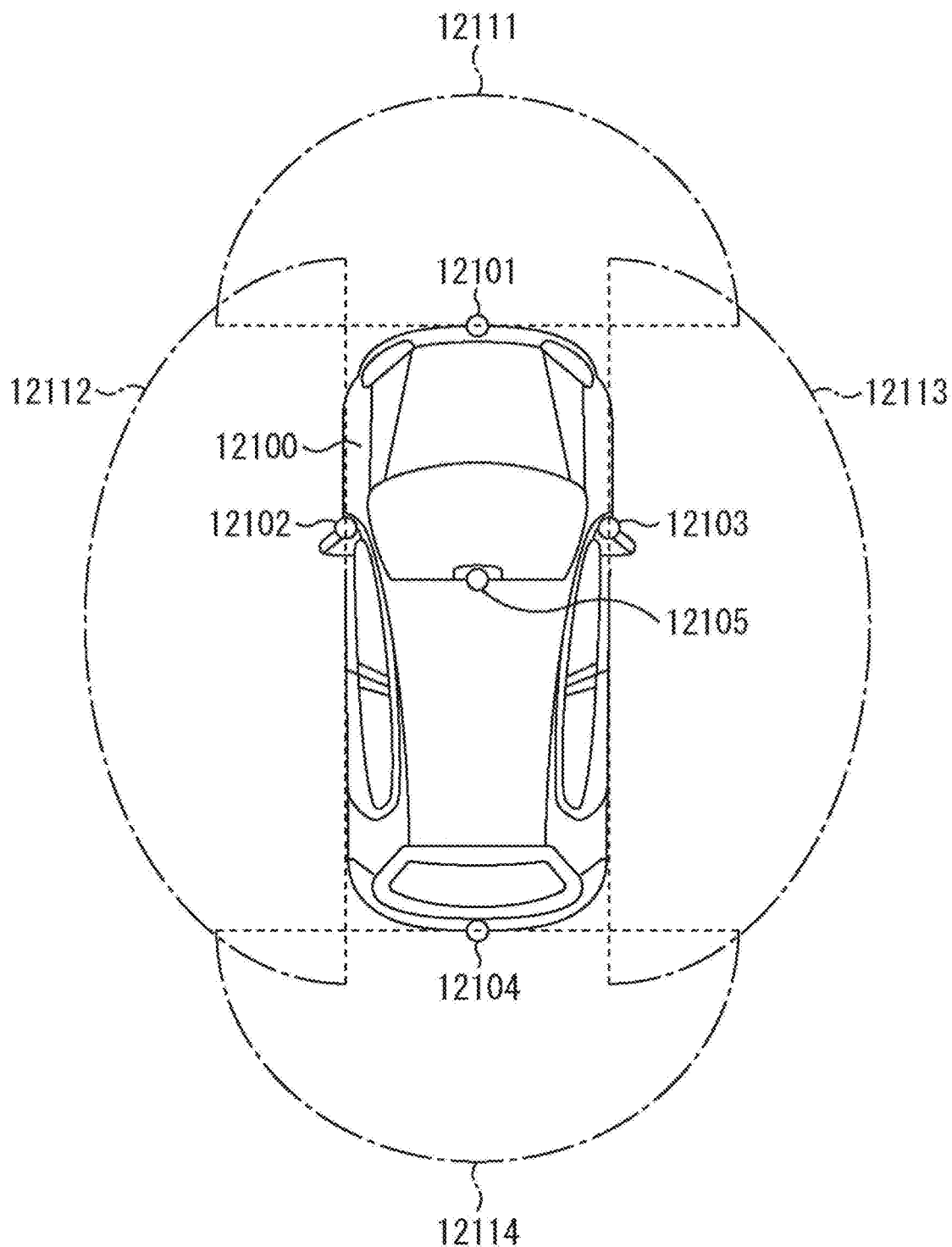
FIG. 31 is an explanatory diagram illustrating an example of positions at which a vehicle outside information detection unit and an image pickup unit are provided.

FIG. 31 is a diagram illustrating an example of a position at which the image pickup unit 12031 is provided.

In FIG. 31, image pickup units 12101, 12102, 12103, 12104, and 12105 are provided as image pickup units 12031.

The image pickup units 12101, 12102, 12103, 12104, and 12105 are provided at positions of, for example, a front nose, a side-view mirror, a rear bumper, and a back door of the vehicle 12100, and at a position of, for example, an upper part of a windshield inside the vehicle room. The image pick up unit 12101 provided at the front nose, and the image pick up unit 12105 provided at the upper part of the windshield inside the vehicle room, mainly obtain an image viewed from the front of the vehicle 12100. The image pick up units 12102 and 12103 provided at the side-view mirrors respectively mainly obtain images viewed from the sides of the vehicle 12100. The image pick up unit 12104 provided at the rear bumper or the back door mainly obtains an image viewed from the back of the vehicle 12100. The image pick up unit 12105 provided at the upper part of the windshield inside the vehicle room is mainly used to detect preceding vehicles, or walkers, obstacles, traffic lights, traffic signs, traffic lanes, or the like.

It should be noted that FIG. 31 shows, as an example, imaging ranges of the respective image pickup units 12101 to 12104. An image pick up range 12111 indicates an image pick up range of the image pick up unit 12101 provided at the front nose; image pick up ranges 12112 and 12113 indicate image pick up ranges of the image pick up units 12102 and 12103 provided at the side-view mirrors respectively; and an image pick up range 12114 indicates an image pick up range of the image pick up unit 12104 provided at the rear bumper or the back door. Superimposing image data picked up by, for example, the image pick up units 12101 to 12104 enables a bird's-eye view image of the vehicle 12100 viewed from the upper part to be obtained.

At least one of the image pickup units 12101 to 12104 may have a function of obtaining distance information. For example, at least one of the image pickup units 12101 to 12104 may be a stereo camera that includes a plurality of image pickup elements, or may be an image pickup element having a pixel for detecting a phase difference.

For example, the microcomputer 12051 determines a distance to each three-dimensional object in the image capturing ranges 12111 to 12114, and a temporal change of this distance (a relative speed with respect to the vehicle 12100), on the basis of distance information obtained from the image pickup units 12101 to 12104. Consequently, in particular, a three-dimensional object that is the closest on a traveling path of the vehicle 12100, and that is traveling at a predetermined speed (for example, 0 km/h or more) substantially in the same direction as that of the vehicle 12100, can be extracted as a preceding vehicle. Moreover, the microcomputer 12051 sets a distance between vehicles, which should be kept beforehand behind a preceding vehicle. Consequently, automatic brake control (also including follow-up stop control), automatic acceleration control (also including follow-up start control), and the like can be performed. In this manner, the microcomputer 12051 is capable of performing cooperative control for the purpose of, for example, automatic driving that causes a vehicle to autonomously travel without depending on driver's operation.

For example, on the basis of distance information obtained from the image pickup units 12101 to 12104, the microcomputer 12051 classifies three-dimensional object data related to three-dimensional objects into other three-dimensional objects such as a two-wheeled vehicle, an ordinary vehicle, a large-sized vehicle, a walker, and a utility pole, and then extracts the three-dimensional object data. The microcomputer 12051 is capable of using the three-dimensional object data to automatically avoid obstacles. For example, the microcomputer 12051 identifies an obstacle around the vehicle 12100 as an obstacle that can be visually recognized by a driver of the vehicle 12100 or as an obstacle that is hard to visually recognize. In addition, the microcomputer 12051 determines a collision risk indicating a degree of risk of collision with each obstacle. When the collision risk is a set value or higher, and thus is in a situation in which there is a possibility of collision, driving assistance for avoiding a collision can be performed by outputting a warning to a driver through the audio speaker 12061 or the display unit 12062, or by carrying out forced deceleration and avoidance steering through the drive system control unit 12010.

At least one of the image pickup units 12101 to 12104 may be an infrared camera that detects infrared rays. For example, by determining whether or not a walker exists in picked-up images of the image pickup units 12101 to 12104, the microcomputer 12051 is capable of recognizing the walker. Such recognition of a walker is performed by: a step of extracting, for example, feature points in the picked-up images of the image pickup units 12101 to 12104 that are infrared cameras; and a step of subjecting a series of feature points indicating an outline of an object to pattern matching processing, and determining whether or not the object is a walker. If the microcomputer 12051 determines that a walker exists in the picked-up images of the image pickup units 12101 to 12104, and consequently recognizes the walker, the sound-image output unit 12052 controls the display unit 12062 in such a manner that a rectangular profile line for emphasis is superimposed on the recognized walker. In addition, the sound-image output unit 12052 may control the display unit 12062 in such a manner that an icon or the like indicating a walker is displayed at a desired position.

The example of the vehicle control system to which the technology according to the present disclosure can be applied has been explained above. The technology according to the present disclosure can be applied to the image pickup unit 12031 (including the image pickup units 12101 to 12104) among the configurations described above. Specifically, for example, the solid-state image pickup device 1 of FIG. 1 can be applied to the image pickup unit 12031. The computation unit 23 of FIG. 3 and the computation unit 73 of FIG. 16 can be applied to the vehicle outside information detection unit 12030 or the like. The unillustrated light-emitting unit of active light can be applied to the body system control unit 12020. By applying the technology according to the present disclosure to the image pickup unit 12031, when background light is desired to be eliminated in, for example, an on-vehicle device, exposure does not extend over frames. Therefore, a particular effect of being strong in movement can be achieved.

It should be noted that in the present description, the step that states the series of processing includes, of course, not only the processing that is performed according to the above-described order in a time-series manner, but also processing that is executed in parallel or individually even if the processing is not necessarily handled in a time-series manner.

In addition, the embodiments in the present disclosure are not limited to the embodiments described above. Various modifications can be made within the scope that does not deviate from the gist of the present disclosure.

Additionally, the configuration that has been explained as above as one device (or processing unit) may be divided so as to be configured as a plurality of devices (or processing units). In contrast, the configuration that has been explained as above as the plurality of devices (or processing units) may be put together so as to be configured as one device (or processing unit). Moreover, it is needless to say that a configuration other than those described above may be added to the configuration of each device (or each processing unit). Furthermore, if the configuration and operation as a system as a whole are substantially the same, a part of a configuration of a certain device (or processing unit) may be included in a configuration of another device (or another processing unit). In other words, the present technology is not limited to the above-described embodiments, and various modifications can be made within the scope that does not deviate from the gist of the present technology.

The preferable embodiments of the present disclosure have been described in detail as above with reference to the accompanying drawings. However, the disclosure is not limited to the above-described examples. It is clear that if a person has ordinary skill in the technical field to which the present disclosure belongs, the person is able to conceive of various correction examples or modification examples within the category of the technical idea set forth in the claims. It should be understood that, of course, these examples also belong to the technical range of the present disclosure.

It should be noted that the present technology can also employ the following configurations.

(1) A solid-state image pickup device including:

a pixel array unit on which pixels are two-dimensionally arranged; and a light exposure control unit that controls light exposure time of a first pixel, and light exposure time of a second pixel that differs in light exposure time from the first pixel in such a manner that at least one of light exposure start time or light exposure end time differs according to light emission time of predetermined light in the pixel array unit.

(2) The solid-state image pickup device set forth in the preceding (1), in which the light exposure control unit controls the light exposure time of the first pixel and the light exposure time of the second pixel in such a manner that the light exposure start time differs according to the light emission time of the predetermined light.

(3) The solid-state image pickup device set forth in the preceding (1) or (2), in which the light exposure control unit controls the light exposure time of the first pixel and the light exposure time of the second pixel in such a manner that the light exposure start time differs by changing an inclusion ratio of the light emission time of the predetermined light.

(4) The solid-state image pickup device set forth in any of the preceding (1) to (3), in which the pixel includes a PD.

(5) The solid-state image pickup device set forth in the preceding (4), in which the light exposure control unit controls the light exposure start time by reset operation, and controls the light exposure end time by charge transfer.

(6) The solid-state image pickup device set forth in any of the preceding (1) to (3), in which the pixel includes an organic or inorganic photoelectric conversion film.

(7) The solid-state image pickup device set forth in the preceding (6), in which the light exposure control unit controls the light exposure start time by reset operation, and controls the light exposure end time by an upper electrode of the photoelectric conversion film.

(8) The solid-state image pickup device set forth in the preceding (6), in which the light exposure control unit controls the light exposure start time of at least one of the first pixel or the second pixel by an upper electrode of the photoelectric conversion film, and controls the light exposure end time by the upper electrode of the photoelectric conversion film.

(9) The solid-state image pickup device set forth in the preceding (1), in which the light exposure control unit controls the light exposure time of the first pixel and the light exposure time of the second pixel in such a manner that at least one of the light exposure start time or the light exposure end time differs according to light emission times of a plurality of the predetermined lights.

(10) The solid-state image pickup device set forth in the preceding (9), in which the light exposure control unit controls the light exposure time of the first pixel and the light exposure time of the second pixel in such a manner that at least one of the light exposure start time or the light exposure end time differs by changing inclusion ratios of the light emission times of a plurality of the predetermined lights respectively.

(11) The solid-state image pickup device set forth in any of the preceding (1) to (10), further including a computation unit that subjects images from the first pixel and the second pixel to mosaic processing, and performs computation processing on a pixel basis.

(12) The solid-state image pickup device set forth in the preceding (1), in which the light exposure control unit controls the light exposure time of the first pixel, the light exposure time of the second pixel, and the light exposure time of a third pixel that differs in light exposure time from the first pixel and the second pixel in such a manner that at least one of the light exposure start time or the light exposure end time differs according to light emission times of a plurality of the predetermined lights.

(13) The solid-state image pickup device set forth in the preceding (12), in which the light exposure control unit controls the light exposure time of the first pixel, the light exposure time of the second pixel, and the light exposure time of the third pixel in such a manner that at least one of the light exposure start time or the light exposure end time differs according to the light emission times of the plurality of predetermined lights.

(14) The solid-state image pickup device set forth in the preceding (12) or (13), further including a computation unit that subjects images from the first pixel, the second pixel and the third pixel to mosaic processing, and performs computation processing on a pixel basis.

(15) The solid-state image pickup device set forth in any of the preceding (1) to (14), in which the pixel array unit includes a pixel having a conversion efficiency adjustable function.

(16) An image pickup method including the step of controlling, by a solid-state image pickup device, light exposure time of a first pixel, and light exposure time of a second pixel that differs in light exposure time from the first pixel in such a manner that at least one of light exposure start time or light exposure end time differs according to light emission time of predetermined light in a pixel array unit on which pixels are two-dimensionally arranged.

(17) An electronic apparatus including:

a light-emitting unit that emits light; and a solid-state image pickup device, the solid-state image pickup device including:

a pixel array unit on which pixels are two-dimensionally arranged; and a light exposure control unit that controls light exposure time of a first pixel, and light exposure time of a second pixel that differs in light exposure time from the first pixel in such a manner that at least one of light exposure start time or light exposure end time differs according to light emission time of light emitted by the light-emitting unit in the pixel array unit.

REFERENCE SIGNS LIST

1 Solid-state image pickup device
2, 2-1 to 2-3 Pixel
3 Pixel area
5 Column signal processing circuit
7 Vertical control line
8 Control circuit
21 Output image
22-1, 22-2 Image
23 Computation unit
24 Light exposure image
31 OFG transistor
32 TRX transistor
33 TRG transistor
34 PD
35 Capacitor
36 RST transistor
37 AMP transistor
38 SEL transistor
39 FD
41 Photoelectric conversion film
42 Transparent electrode
43 Lower electrode
61, 62 Active light 71 Output image
72-1, 72-2 Image
73 Computation unit
74 Light exposure image
111 Clock generator
112 DAC
121 Comparator
122 Counter
150 Image pickup device
151 Pixel substrate
152 Circuit substrate
161 Pixel circuit
171 Pixel unit
181 Circuit block
200 Conversion efficiency adjustable function
201 Transistor
202 Capacitor
300 Electronic apparatus
301 Solid-state image pickup device
302 Optical lens
303 Shutter device
304 Driving circuit
305 Signal processing circuit

The invention claimed is:

1. A solid-state image pickup device comprising:
a pixel array unit on which pixels are two-dimensionally arranged; and
a light exposure control unit configured to control a light exposure time of a first pixel, and a light exposure time of a second pixel that differs in light exposure time from the first pixel in such a manner that at least one of light exposure start time or light exposure end time differs according to light emission time of predetermined light in the pixel array unit, wherein
the light exposure control unit is configured to control the light exposure time of the first pixel and the light exposure time of the second pixel in such a manner that at least one of the light exposure start time or the light exposure end time differs according to light emission times of a plurality of the predetermined lights.

2. The solid-state image pickup device according to claim 1, wherein
the light exposure control unit controls the light exposure time of the first pixel and the light exposure time of the second pixel in such a manner that the light exposure start time differs according to the light emission time of the predetermined light.

3. The solid-state image pickup device according to claim 1, wherein
the light exposure control unit controls the light exposure time of the first pixel and the light exposure time of the second pixel in such a manner that the light exposure start time differs by changing an inclusion ratio of the light emission time of the predetermined light.

4. The solid-state image pickup device according to claim 1, wherein
the pixel includes a PD.

5. The solid-state image pickup device according to claim 4, wherein
the light exposure control unit controls the light exposure start time by reset operation, and controls the light exposure end time by charge transfer.

6. The solid-state image pickup device according to claim 1, wherein
the pixel includes an organic or inorganic photoelectric conversion film.

7. The solid-state image pickup device according to claim 6, wherein
the light exposure control unit controls the light exposure start time by reset operation, and controls the light exposure end time by an upper electrode of the photoelectric conversion film.

8. The solid-state image pickup device according to claim 6, wherein
the light exposure control unit controls the light exposure start time of at least one of the first pixel or the second pixel by an upper electrode of the photoelectric conversion film, and controls the light exposure end time by the upper electrode of the photoelectric conversion film.

9. The solid-state image pickup device according to claim 1, wherein
the pixel array unit includes a pixel having a conversion efficiency adjustable function.

10. A solid-state image pickup device comprising:
a pixel array unit on which pixels are two-dimensionally arranged; and
a light exposure control unit configured to control a light exposure time of a first pixel, and a light exposure time of a second pixel that differs in light exposure time from the first pixel in such a manner that at least one of light exposure start time or light exposure end time differs according to light emission time of predetermined light in the pixel array unit, wherein
the light exposure control unit controls the light exposure time of the first pixel and the light exposure time of the second pixel in such a manner that at least one of the light exposure start time or the light exposure end time differs by changing inclusion ratios of the light emission times of a plurality of the predetermined lights respectively.

11. A solid-state image pickup device comprising:
a pixel array unit on which pixels are two-dimensionally arranged; and
a light exposure control unit configured to control a light exposure time of a first pixel, and a light exposure time of a second pixel that differs in light exposure time from the first pixel in such a manner that at least one of light exposure start time or light exposure end time differs according to light emission time of predetermined light in the pixel array unit, wherein
the light exposure control unit controls the light exposure time of the first pixel, the light exposure time of the second pixel, and the light exposure time of a third pixel that differs in light exposure time from the first pixel and the second pixel in such a manner that at least one of the light exposure start time or the light exposure end time differs according to light emission times of a plurality of the predetermined lights.

12. The solid-state image pickup device according to claim 11, wherein
the light exposure control unit controls the light exposure time of the first pixel, the light exposure time of the second pixel, and the light exposure time of the third pixel in such a manner that at least one of the light exposure start time or the light exposure end time differs by changing inclusion ratios of the light emission times of the plurality of predetermined lights respectively.

13. The image pickup device according to claim 11, further comprising
a computation unit that subjects images from the first pixel, the second pixel, and the third pixel to mosaic processing, and performs computation processing on a pixel basis.

14. An image pickup method comprising:
controlling, by a solid-state image pickup device, a light exposure time of a first pixel, and a light exposure time of a second pixel that differs in light exposure time from the first pixel in such a manner that at least one of light exposure start time or light exposure end time differs according to light emission time of predetermined light in a pixel array unit on which pixels are two-dimensionally arranged, including controlling the light exposure time of the first pixel and the light exposure time of the second pixel in such a manner that at least one of the light exposure start time or the light exposure end time differs according to light emission times of a plurality of the predetermined lights.

15. An electronic apparatus comprising:
a light-emitting unit that emits light; and
a solid-state image pickup device, the solid-state image pickup device including:
a pixel array unit on which pixels are two-dimensionally arranged; and
a light exposure control unit configured to control a light exposure time of a first pixel, and a light exposure time of a second pixel that differs in light exposure time from the first pixel in such a manner that at least one of light exposure start time or light exposure end time differs according to light emission time of light emitted by the light-emitting unit in the pixel array unit, wherein
the light exposure control unit is configured to control the light exposure time of the first pixel and the light exposure time of the second pixel in such a manner that at least one of the light exposure start time or the light exposure end time differs according to light emission times of a plurality of the predetermined lights.

* * * * *